US009732593B2

United States Patent
Al-Zawawi et al.

(10) Patent No.: US 9,732,593 B2
(45) Date of Patent: Aug. 15, 2017

(54) SYSTEMS, METHODS, AND COMPUTER MEDIUM TO OPTIMIZE STORAGE FOR HYDROCARBON RESERVOIR SIMULATION

(71) Applicant: Saudi Arabian Oil Company, Dhahran (SA)

(72) Inventors: Ahmed S. Al-Zawawi, Dhahran (SA); Santiago Ariel Ganis, Rakkah (SA); Abdulaziz Al-Subaie, Dammam (SA); Majdi Baddourah, Dhahran (SA); Badr M. Harbi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 471 days.

(21) Appl. No.: 14/533,683

(22) Filed: Nov. 5, 2014

(65) Prior Publication Data

US 2016/0123120 A1     May 5, 2016

(51) Int. Cl.
*G06G 7/48* (2006.01)
*E21B 43/00* (2006.01)
(Continued)

(52) U.S. Cl.
CPC ............ *E21B 43/00* (2013.01); *G01V 99/005* (2013.01); *G06F 17/30165* (2013.01); *G06F 17/5009* (2013.01); *G06F 2217/04* (2013.01)

(58) Field of Classification Search
CPC .......... G01V 11/00; E21B 43/00; G06N 7/00; G06N 7/005; G06Q 10/06; G06F 17/5009;
(Continued)

(56) References Cited

U.S. PATENT DOCUMENTS 5,680,611 A   10/1997 Rail et al.
5,778,395 A   7/1998 Whiting et al.
(Continued)

OTHER PUBLICATIONS

International Search Report and Written Opinion for related PCT application PCT/US2015/056620 dated Feb. 25, 2016.
(Continued)

*Primary Examiner* — Kandasamy Thangavelu
(74) *Attorney, Agent, or Firm* — Bracewell LLP; Constance G. Rhebergen; Brian H. Tompkins

(57) ABSTRACT

Embodiments of systems, non-transitory computer-readable medium having one or more computer programs stored therein, and computer-implemented methods are provided to enhance data storage and retrieval during performance of a plurality of hydrocarbon reservoir simulation runs of one or more hydrocarbon reservoir simulation models. Embodiments can relate to performing hydrocarbon reservoir simulation runs while efficiently storing simulation files by utilizing file links rather than duplicate copies of simulation files. Efficient storage can also include use of one or more shared storage locations and other separate individual hydrocarbon reservoir simulation model storage locations. Simulation files stored in the shared storage locations can be shared among a plurality of hydrocarbon reservoir simulation models. Embodiments can further relate to efficient data storage during the building, copying, or editing of a hydrocarbon reservoir simulation model.

24 Claims, 9 Drawing Sheets

(51) Int. Cl.
*G06F 17/50* (2006.01)
*G01V 99/00* (2009.01)
*G06F 17/30* (2006.01)

(58) Field of Classification Search
CPC .. G06F 17/30153; G06F 9/5006; G06F 17/50;
G05B 13/047
See application file for complete search history.

(56) References Cited

U.S. PATENT DOCUMENTS

| | | | |
|---|---|---|---|
| 6,389,433 B1 | 5/2002 | Bolosky et al. | |
| 6,704,730 B2 | 3/2004 | Moulton et al. | |
| 7,509,423 B2 | 3/2009 | Douceur et al. | |
| 8,244,690 B2 | 8/2012 | Iitsuka | |
| 8,548,953 B2* | 10/2013 | Wong | G06F 17/30153 |
| | | | 707/664 |
| 2004/0220790 A1* | 11/2004 | Cullick | G06Q 10/06 |
| | | | 703/10 |
| 2009/0204650 A1 | 8/2009 | Wong et al. | |
| 2010/0057415 A1* | 3/2010 | Chu | G06F 17/5009 |
| | | | 703/6 |
| 2010/0094817 A1 | 4/2010 | Ben-Shaul et al. | |
| 2011/0060572 A1* | 3/2011 | Brown | E21B 43/00 |
| | | | 703/10 |
| 2012/0022841 A1 | 1/2012 | Appleyard | |
| 2012/0191675 A1 | 7/2012 | Kim et al. | |
| 2012/0253770 A1* | 10/2012 | Stern | G01V 11/00 |
| | | | 703/10 |
| 2013/0024173 A1* | 1/2013 | Brzezicki | G06N 7/005 |
| | | | 703/6 |
| 2013/0151471 A1 | 6/2013 | Jayaraman et al. | |
| 2013/0197677 A1* | 8/2013 | Gahinet | G05B 13/047 |
| | | | 700/33 |
| 2013/0339319 A1 | 12/2013 | Woodward et al. | |
| 2014/0122028 A1* | 5/2014 | Aberg | G06F 17/50 |
| | | | 703/1 |
| 2014/0172773 A1* | 6/2014 | Schmidt | G06N 7/00 |
| | | | 706/54 |
| 2014/0310722 A1* | 10/2014 | McGaughy | G06F 9/5066 |
| | | | 718/105 |

OTHER PUBLICATIONS

Bolosky et al. "Single Instance Storage in Windows 2000" Proceedings of 4th USENIX Windows Systems Symposium, 2000, 12 pages.
Kaiser et al. "Design of an Exact Data Deduplication Cluster" IEEE, 2012 28th Symposium on Mass Storage Systems and Technologies, San Diego, CA, Apr. 16-20, 2012, 12 pages.
Meyer et al. "A study of practical deduplication" ACM Transactions on Storage (TOS), vol. 7, Issue 4, Article No. 14, Jan. 1, 2012, 13 pages.
Zhengda et al. "A Novel Data Redundancy Scheme for De-duplication Storage System" IEEE, 2010 3rd International Symposium on Knowledge Acquisition and Modeling, Wuhan, China, Oct. 20-21, 2010, pp. 293-296.

* cited by examiner

SYSTEMS, METHODS, AND COMPUTER MEDIUM TO OPTIMIZE STORAGE FOR HYDROCARBON RESERVOIR SIMULATION

BACKGROUND OF THE INVENTION

Field of the Invention

Embodiments of the invention relate to hydrocarbon reservoir production and, more specifically, to methods, systems, and non-transitory computer-readable medium having computer program stored therein to simulate fluid flow within hydrocarbon reservoirs.

Description of the Related Art

Simulated models of hydrocarbon reservoirs may be used to simulate fluid flow of hydrocarbons or other fluids within a reservoir. These hydrocarbon reservoir simulation models may require a large amount of data, however, as input during the simulation process, which may consist of one or more hydrocarbon reservoir simulation runs. That is, a real hydrocarbon reservoir or real hydrocarbon field may be modeled using a mathematical representation of the real reservoir or field. The resulting reservoir model, for example, is an approximation of reality. The accuracy of these models may depend on the available data, the physics of the real reservoir captured by the reservoir simulation, and engineer insight and availability. As more data becomes available, a new reservoir model may be constructed and an older model archived. Each model that is constructed is a representation of the real reservoir and is part of a hydrocarbon reservoir simulation study with a specific objective or goal. A hydrocarbon reservoir simulation study, for example, may include one or more simulation runs (sometimes called "jobs"). That is, within a reservoir study, a model may be built then iteratively modified so as to create hundreds of model versions until a final reservoir model is found that meets the objective of the study. Model versions may also be described, in some circumstances, as simply "models." Further, model versions may also be described as "jobs" because they are submitted to a job scheduling system. Similarly, model versions may be described as "runs" because they run on a cluster. Each model version frequently has only one job and is only processed (i.e., run) once, although exceptions may occur when a run fails, when a need to reproduce results exists, or when using different simulation versions.

Furthermore, hydrocarbon reservoir simulation models may produce a large amount of data as output of each hydrocarbon reservoir simulation run. Data associated with each hydrocarbon reservoir simulation model may be stored separately, however. That is, each model may have its own set of stored data, including input and output data. In some cases, two or more models may each store the same data. For example, some of the output data of two different hydrocarbon reservoir simulation runs may be the same when each hydrocarbon reservoir simulation run is associated with the same hydrocarbon reservoir. In addition, two models may require the same input data, for another example. In both examples, each hydrocarbon reservoir simulation model may nonetheless be associated with a separate copy of the stored data. Consequently, a hydrocarbon reservoir simulation process may produce and consume large amounts of data. Over the past ten years, for example, data storage requirements have grown exponentially.

Two hydrocarbon reservoir simulation models or multiple projects may require the same hydrocarbon reservoir simulation input files, for example. As illustrated in FIG. 1A, for example, many hydrocarbon reservoir simulation models may each have their own binary data simulation files 61, ASCII data simulation files 62, and other data simulation files 63. That is, hydrocarbon reservoir simulation model 1 65, hydrocarbon reservoir simulation model 2 66, hydrocarbon reservoir simulation model 3 67, and other hydrocarbon reservoir simulation models through hydrocarbon reservoir simulation model X 68 may each have an associated set of binary data simulation files 61, ASCII data simulation files 62, and other data simulation files 63. In this example, binary input files 61 are repeated. Consequently, each hydrocarbon reservoir simulation model may have its own set of data even when some simulation files in different sets may be the same.

Two main business workflows may exist in hydrocarbon reservoir simulation fields: (1) history-matching studies and (2) prediction studies. History-matching hydrocarbon reservoir simulation studies, as will be understood by those skilled in the art, may include performing hydrocarbon reservoir simulation runs to calibrate a given hydrocarbon reservoir simulation model. For example, after comparing results of the hydrocarbon reservoir simulation runs to observed or predicted data, the hydrocarbon reservoir simulation model may be modified as necessary to produce more accurate results. Prediction hydrocarbon reservoir simulation studies, on the other hand, may include performing hydrocarbon reservoir simulation runs to predict future fluid flow in the hydrocarbon reservoir, for example. An entity may perform a significant number of each type of hydrocarbon reservoir simulation study. As an example, an entity may conduct around 20 history-matching hydrocarbon reservoir simulation studies and over 1,000 prediction hydrocarbon reservoir simulation studies annually. In a single year, furthermore, these studies may amount to more than 100,000 hydrocarbon reservoir simulation runs. In these studies, hydrocarbon reservoir simulation runs may evolve incrementally based on manual changes by simulation engineers, who may duplicate hydrocarbon reservoir simulation input data based on previous hydrocarbon reservoir simulation runs and perform slight modifications. In addition, hydrocarbon reservoir simulation runs may evolve responsive to automatically utilizing assisted history-matching and optimization packages that deploy a variety of optimization algorithms to maximize a set objective function, e.g., minimize history match error, maximize net present value (NPV), maximize oil recovery, etc. As a result, output data generated by a hydrocarbon reservoir simulator, as will be understood by those skilled in the art, may tend to have a lot of duplication due to minimal changes that may be introduced by the user, such as, for example, static and dynamic history data and geometrical information.

For example, Applicant has recognized that more than three-quarters of an entity's storage capacity may be dedicated to duplicated data, in some circumstances. An example is illustrated in FIG. 1C, which depicts the size in storage of files, for example. In this example, approximately 900 history-matching hydrocarbon reservoir simulation runs over the course of three months have produced approximately 2,000 files that require 8,076 GB of disk space. Of this data, however, only 1,976 GB correspond to unique files, whereas the other 6,296 GB correspond to duplicated files. That is, as is further illustrated in FIG. 1D, approximately 76.1% of the entity's stored data, as measured in gigabytes, is dedicated to duplicated data 98 in this example. That is, the percentage of unique data 97 to duplicated data 98 is depicted in FIG. 1D, for example.

A simulation engineer may manually manage multiple hydrocarbon reservoir simulation models by duplicating all input data for a hydrocarbon reservoir simulation model that is required for both history-matching and prediction hydrocarbon reservoir simulation studies. For example, a method to perform a hydrocarbon reservoir simulation run may include user interaction 50 and simulator action, as illustrated in FIG. 1B. For example, after a start 51, user interaction 50 may include collecting simulation data 52, such as hydrocarbon reservoir description data, then building a hydrocarbon reservoir simulation model 52. A user may then choose to either select a hydrocarbon reservoir simulation model 54 or duplicate a hydrocarbon reservoir simulation model 55. If the user duplicates a hydrocarbon reservoir simulation model 55, the user may then select a hydrocarbon reservoir simulation model 54. After selecting a hydrocarbon reservoir simulation model 54, a user may choose whether to run the hydrocarbon reservoir simulation model 56, i.e., whether to perform a hydrocarbon reservoir simulation run of the selected hydrocarbon reservoir simulation model. If the user chooses not to run the hydrocarbon reservoir simulation model 56, the user may then modify the selected hydrocarbon reservoir simulation model 57. After modifying the hydrocarbon reservoir simulation model 57, the user may then again select a hydrocarbon reservoir simulation model 54. For example, the user may select the modified hydrocarbon reservoir simulation model. If the user chooses to run the hydrocarbon reservoir simulation model 56, the hydrocarbon reservoir simulation run may be started 58 and may produce some output 59, such as, for example, simulation files.

Data may be "de-duplicated," for example, by combing through existing data files manually to identify duplicate data. Duplicate data may be deleted, and file links may be used instead. Further, using file links to optimize storage may be a shared storage implementation in Linux file systems. But deduplication as part of a backup, sync, or cleanup process as a solution may be time-consuming because it may require investigating all files in both primary and secondary file systems.

SUMMARY OF THE INVENTION

A significant part of an entity's data storage capacity for hydrocarbon reservoir simulation data can be dedicated to duplicated data. An entity with limited data storage capacity can consequently wish to reduce the amount of duplicated hydrocarbon reservoir simulation data that it stores. Deduplicating a large amount of existing data can be time-consuming and resource-intensive, however, particularly for entities that have a large amount of hydrocarbon reservoir simulation data. As a result, it can be desirable to deduplicate hydrocarbon reservoir simulation data as hydrocarbon reservoir simulation data is added or created, i.e., as part of the hydrocarbon reservoir simulation process.

Having recognized that, in some cases, data storage has been inefficiently allocated among different hydrocarbon reservoir simulation models and different hydrocarbon reservoir simulation runs, embodiments of the invention can include systems, non-transitory computer medium having computer program product stored therein, and computer-implemented methods to enhance data storage and retrieval during performance of a plurality of hydrocarbon reservoir simulation runs of one or more hydrocarbon reservoir simulation models. Further, embodiments can thereby reduce data storage capacity required for hydrocarbon reservoir simulation runs and failure risks for hydrocarbon reservoir simulation runs.

More specifically, embodiments of the claimed invention can include a novel algorithm to enhance the hydrocarbon reservoir simulation process where the underlying complexity of efficiently managing storage is masked. The new novel algorithm can optimize storage by eliminating non-unique hydrocarbon reservoir simulation input and output data files for multiple hydrocarbon reservoir simulation models. Users and third-party applications can be unaware that storage optimization takes place when a hydrocarbon reservoir simulation run is created, duplicated, or submitted. This algorithm can be implemented in the simulation reservoir environment and can be enforced automatically. Advantageously, the simulation environment—rather than, for example, a file system—can manage deduplication. Further, the algorithm can ensure seamless integration with post-simulation analysis tools such as, for example, three-dimensional visualization, well plotting, etc. For example, the algorithm can include (1) optimizing binary hydrocarbon reservoir simulation input data for multiple hydrocarbon reservoir simulation runs by using single unique files and utilizing file links for multiple hydrocarbon reservoir simulation runs. In addition, the algorithm can include (2) optimizing ASCII hydrocarbon reservoir simulation input data for multiple hydrocarbon reservoir simulation runs by using file links and only creating a copy of the data when modification is required. Furthermore, the algorithm can include (3) optimizing binary output data for multiple simulation runs by using single unique files and utilizing file links for multiple simulation runs.

Embodiments can thus advantageously allow an entity to overcome exponential hydrocarbon reservoir simulation data growth and reduce the high performance storage requirements that can be necessary to meet the high business demand for hydrocarbon reservoir simulations. Embodiments can eliminate observed data duplication in simulation models (e.g., non-unique static and dynamic data and geometrical information) generated by a hydrocarbon reservoir simulator. Consequently, embodiments can allow for more efficient utilization of high performance storage resources across different studies. Further, deduplication can occur as part of a hydrocarbon reservoir simulation process. As a result, embodiments of the invention can enable an entity to capitalize on hydrocarbon reservoir simulation processes to optimize storage, which can thereby produce high returns with low overhead.

For example, a system to enhance data storage and retrieval during performance of a plurality of hydrocarbon reservoir simulation runs of one or more hydrocarbon reservoir simulation models, according to an embodiment, can include one or more processors, one or more displays in communication with the one or more processors, and one or more databases in communication with the one or more processors. The one or more databases can furthermore include a plurality of separate individual hydrocarbon reservoir simulation model storage locations, for example. Each of the plurality of individual hydrocarbon reservoir simulation model storage locations can be associated with one or more hydrocarbon reservoir simulation models. The one or more databases can also include one or more other storage locations, separate from the plurality of individual hydrocarbon reservoir simulation model storage locations. The one or more other storage locations, for example, can have a plurality of simulation files stored therein. The one or more other storage locations can also be configured to share the plurality of simulation files among the one or more hydrocarbon reservoir simulation models and can thereby define one or more shared storage locations. Further, the plurality of simulation files being shared among the one or more hydrocarbon reservoir simulation models being stored in the one or more shared locations can also define shared simulation files, for example. A system can also include non-transitory memory medium in communication with the one or more processors. The memory medium, for example, can include a hydrocarbon reservoir simulation run module and a linking module.

The hydrocarbon reservoir simulation run module can include computer-readable instructions stored therein that when executed cause the system to perform a series of steps. The steps can include, for example, initiating a plurality of hydrocarbon reservoir simulation runs of one or more hydrocarbon reservoir simulation models, responsive to user run-request action. The steps can further include retrieving, for two or more of the plurality of hydrocarbon reservoir simulation runs, a selected one of the one or more shared simulation files from the one or more shared storage locations. The selected one of the one or more shared simulation files can be for use as an input simulation file during the two or more of the plurality of hydrocarbon reservoir simulation runs. In addition, the selected one of the one or more simulation files can be the same of the one or more shared simulation files. The steps can also include completing each of the plurality of hydrocarbon reservoir simulation runs, responsive to the retrieved same one of the one or more shared simulation files. Further, the steps can include producing a plurality of output simulation result files associated with and responsive to each of the plurality of hydrocarbon reservoir simulation runs. Each of the plurality of output simulation result files can be associated with a hydrocarbon reservoir simulation model. The steps can also include storing each output simulation result file in one or more of the plurality of individual hydrocarbon reservoir simulation model storage locations. More specifically, the one or more of the plurality of individual hydrocarbon reservoir simulation model storage locations can be associated with the hydrocarbon reservoir simulation model associated with the output simulation result file.

The linking module can also include computer-readable instructions stored therein that when executed cause the system to perform a series of steps. The steps of the linking module can include, for example, comparing each of a plurality of output simulation result files to each of the shared simulation files stored in the one or more shared storage locations. The steps can also include determining when one or more of the plurality of output simulation result files each has a file attribute match with one or more of the shared simulation files. Further, the steps can include updating the one or more shared storage locations, responsive to the plurality of output simulation result files. For example, the updating can include linking a hydrocarbon reservoir simulation model and one or more shared simulation files when each of the one or more shared simulation files has a file attribute match with one or more of the plurality of output simulation result files associated with the hydrocarbon reservoir simulation model. The updating can further include copying one or more of the plurality of output simulation result files to the one or more shared storage locations when each of the one or more of the plurality of output simulation result files lacks a file attribute match with any of the shared simulation files. In addition, the one or more of the plurality of output simulation result files lacking a file attribute match with any of the shared simulation files can thereby define one or more copy simulation files. The updating can also include linking a hydrocarbon reservoir simulation model and each of the one or more copy simulation files associated with the hydrocarbon reservoir simulation model stored in the one or more shared storage locations. The steps of the linking module can then include, for example, discarding each of the plurality of output simulation result files stored in the plurality of individual hydrocarbon reservoir simulation model storage locations. Notably, discarding the output simulation result files stored in the plurality of individual hydrocarbon reservoir simulation model storage locations can make data storage capacity available to other hydrocarbon reservoir simulation runs. Moreover, discarding the output simulation result files stored in the plurality of individual hydrocarbon reservoir simulation model storage locations can thereby reduce data storage capacity required for hydrocarbon reservoir simulation runs and failure risks for hydrocarbon reservoir simulation runs.

In addition, each of the plurality of individual hydrocarbon reservoir simulation model storage locations can be configured to store ASCII hydrocarbon reservoir data in one or more ASCII simulation files, for example. Further, the one or more shared storage locations can be configured to store binary hydrocarbon reservoir data in one or more binary shared simulation files. The one or more shared storage locations can also be configured to store other ASCII hydrocarbon reservoir data in another one or more ASCII shared simulation files. As a result, binary hydrocarbon reservoir data can be isolated in the one or more shared storage locations. A system according to an embodiment can further include one or more input and output units in communication with the one or more processors. The one or more input and output units can also be positioned to receive as input one or more user actions. Further, the memory medium can also include a hydrocarbon reservoir simulation model-editing module, for example, that includes computer-readable instructions stored therein that when executed cause the system to perform a series of steps. The steps, for example, can include altering one or more ASCII shared simulation files associated with a hydrocarbon reservoir simulation model stored in the one or more shared storage locations—responsive to user edit-request action through the one or more input and output units—when each of the one or more ASCII shared simulation files is linked to no more than one hydrocarbon reservoir simulation model. The steps can also include copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action through the one or more input and output units, when each of the one or more ASCII shared simulation files is linked to more than one hydrocarbon reservoir simulation model. The copied one or more ASCII shared simulation files can thereby define one or more nonexclusive ASCII simulation files, for instance. The steps can further include linking each of the one or more nonexclusive ASCII simulation files stored in the individual hydrocarbon reservoir simulation model storage location and the associated hydrocarbon reservoir simulation model. The steps can also include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location can thereby isolate edits to the associated hydrocarbon reservoir simulation model to ASCII simulation files stored in the individual hydrocarbon reservoir simulation model storage location.

Similarly, in a system according to an embodiment in which the system further includes one or more input and output units in communication with the one or more processors and positioned to receive as input one or more user actions, the memory medium can further include a hydrocarbon reservoir simulation model-duplicating module, for example. The hydrocarbon reservoir simulation model-duplicating module can include computer-readable instructions stored therein that when executed cause the system to perform the step of linking each of a plurality of simulation files associated with an existing hydrocarbon reservoir simulation model stored in the one or more shared storage locations and a new hydrocarbon reservoir simulation model, responsive to user duplication-request action through the one or more input and output units. Consequently, linking each of the plurality of simulation files associated with an existing hydrocarbon reservoir simulation model and a new hydrocarbon reservoir simulation model can thereby duplicate the existing hydrocarbon reservoir simulation model.

Furthermore, in a system according to an embodiment in which the system further includes one or more input and output units, the one or more input and output units can be in communication with the one or more processors and positioned to receive as input one or more sets of hydrocarbon reservoir description data, in addition to one or more user actions. The memory medium can also further include a hydrocarbon reservoir simulation model-building module, for example. The hydrocarbon reservoir simulation model-building module can include computer-readable instructions stored therein that when executed cause the system to perform the step of creating a new hydrocarbon reservoir simulation model responsive to receipt of hydrocarbon reservoir description data and user creation-request action through the one or more input and output units.

Embodiments can also include non-transitory computer-readable medium having one or more computer programs stored therein. For example, non-transitory computer-readable medium having one or more computer programs stored therein operable by one or more processors, according to an embodiment, can enhance data storage and retrieval during performance of a plurality of hydrocarbon reservoir simulation runs of one or more hydrocarbon reservoir simulation models. The one or more computer programs can include a set of instructions that, when executed by the one or more processors, cause the one or more processors to perform a series of operations. For example, the operations can include initiating a plurality of hydrocarbon reservoir simulation runs of one or more hydrocarbon reservoir simulation models, responsive to user run-request action. The operations can also include retrieving—for two or more of the plurality of hydrocarbon reservoir simulation runs—a selected one of one or more simulation files from one or more storage locations for use as an input simulation file during the two or more of the plurality of hydrocarbon reservoir simulation runs. The one or more storage locations can be configured to share a plurality of simulation files among the one or more hydrocarbon reservoir simulation models and can thereby define one or more shared storage locations, for example. Further, the plurality of simulation files being shared among the one or more hydrocarbon reservoir simulation models being stored in the one or more shared locations can define shared simulation files. In addition, the selected one of the one or more simulation files can be the same of the one or more shared simulation files.

The operations can further include, for example, completing each of the plurality of hydrocarbon reservoir simulation runs, responsive to the retrieved same one of the one or more shared simulation files. Additionally, the operations can include producing a plurality of output simulation result files associated with and responsive to each of the plurality of hydrocarbon reservoir simulation runs. Each of the plurality of output simulation result files can be associated with a hydrocarbon reservoir simulation model. The operations can also include storing each output simulation result file in one or more of a plurality of other storage locations. The one or more of a plurality of other storage locations can thereby define a plurality of separate individual hydrocarbon reservoir simulation model storage locations, for example. Further, each of the plurality of individual hydrocarbon reservoir simulation model storage locations can be associated with one or more hydrocarbon reservoir simulation models. In addition, the one or more of the plurality of individual hydrocarbon reservoir simulation model storage locations can be associated with the hydrocarbon reservoir simulation model that is associated with the output simulation result file.

The operations can still further include comparing each of the plurality of output simulation result files to each of the shared simulation files stored in the one or more shared storage locations. Additionally, the operations can include determining when one or more of the plurality of output simulation result files each has a file attribute match with one or more of the shared simulation files. The operations can also include updating the one or more shared storage locations, responsive to the plurality of output simulation result files. The updating can include, for example, linking a hydrocarbon reservoir simulation model and one or more shared simulation files when each of the one or more shared simulation files has a file attribute match with one or more of the plurality of output simulation result files associated with the hydrocarbon reservoir simulation model. The updating can also include copying one or more of the plurality of output simulation result files to the one or more shared storage locations when each of the one or more of the plurality of output simulation result files lacks a file attribute match with any of the shared simulation files. The one or more of the plurality of output simulation result files lacking a file attribute match with any of the shared simulation files can thereby define one or more copy simulation files, as well. The updating can also include linking a hydrocarbon reservoir simulation model and each of the one or more copy simulation files associated with the hydrocarbon reservoir simulation model stored in the one or more shared storage locations. Further, the operations can also include discarding each of the plurality of output simulation result files stored in the plurality of individual hydrocarbon reservoir simulation model storage locations. Discarding each of the plurality of output simulation result files stored in the plurality of individual hydrocarbon reservoir simulation model storage locations can make data storage capacity available to other hydrocarbon reservoir simulation runs. Discarding each of the plurality of output simulation result files stored in the plurality of individual hydrocarbon reservoir simulation model storage locations can also thereby reduce data storage capacity required for hydrocarbon reservoir simulation runs and failure risks for hydrocarbon reservoir simulation runs.

Additionally, in some circumstances, each of the plurality of individual hydrocarbon reservoir simulation model storage locations can be configured to store ASCII hydrocarbon reservoir data in one or more ASCII simulation files. Further, the one or more shared storage locations can be configured to store binary hydrocarbon reservoir data in one or more binary shared simulation files and other ASCII hydrocarbon reservoir data in another one or more ASCII shared simulation files. This storage arrangement can thereby isolate binary hydrocarbon reservoir data in the one or more shared storage locations. In some non-transitory computer-readable medium having one or more computer programs according to an embodiment, the set of instructions, when executed by the one or more processors, can further cause the one or more processors to perform additional operations. The operations can include, for example, altering one or more ASCII shared simulation files associated with a hydrocarbon reservoir simulation model stored in the one or more shared storage locations, responsive to user edit-request action, when each of the one or more ASCII shared simulation files is linked to no more than one hydrocarbon reservoir simulation model. The operations can also include copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model. The copied one or more ASCII shared simulation files can thereby define one or more nonexclusive ASCII simulation files. In addition, the operations can further include linking each of the one or more nonexclusive ASCII simulation files stored in the individual hydrocarbon reservoir simulation model storage location and the associated hydrocarbon reservoir simulation model. The operations can still further include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location, for example, can thereby isolate edits to the associated hydrocarbon reservoir simulation model to ASCII simulation files stored in the individual hydrocarbon reservoir simulation model storage location.

In some non-transitory computer-readable medium having one or more computer programs stored therein according to an embodiment, the set of instructions, when executed by the one or more processors, can further cause the one or more processors to perform the operation of linking each of a plurality of simulation files associated with an existing hydrocarbon reservoir simulation model stored in the one or more shared storage locations and a new hydrocarbon reservoir simulation model, responsive to user duplication-request action. Linking the simulation files associated with an existing hydrocarbon reservoir simulation model and a new hydrocarbon reservoir simulation model can thereby duplicate the existing hydrocarbon reservoir simulation model.

Likewise, in some non-transitory computer-readable medium having one or more computer programs stored therein according to an embodiment, the set of instructions, when executed by the one or more processors, can further cause the one or more processors to perform the operation of creating a new hydrocarbon reservoir simulation model responsive to receipt of hydrocarbon reservoir description data and user creation-request action.

An embodiment can also include a computer-implemented method to enhance data storage and retrieval during performance of a plurality of hydrocarbon reservoir simulation runs of one or more hydrocarbon reservoir simulation models, for example. A method can include, for instance, initiating a plurality of hydrocarbon reservoir simulation runs of one or more hydrocarbon reservoir simulation models, responsive to user run-request action. Further, a method can include retrieving, for two or more of the plurality of hydrocarbon reservoir simulation runs, a selected one of one or more simulation files from one or more storage locations for use as an input simulation file during the two or more of the plurality of hydrocarbon reservoir simulation runs. The one or more storage locations configured to share a plurality of simulation files among the one or more hydrocarbon reservoir simulation models, for example, can thereby define one or more shared storage locations. Similarly, the plurality of simulation files being shared among the one or more hydrocarbon reservoir simulation models being stored in the one or more shared locations can also define shared simulation files. The selected one of the one or more simulation files can further be the same of the one or more shared simulation files. A method can also include completing each of the plurality of hydrocarbon reservoir simulation runs, responsive to the retrieved same one of the one or more shared simulation files. Further, a method can include producing a plurality of output simulation result files associated with and responsive to each of the plurality of hydrocarbon reservoir simulation runs. Each of the plurality of output simulation result files, for example, can be associated with a hydrocarbon reservoir simulation model. A method can still further include storing each output simulation result file in one or more of a plurality of other storage locations, which can thereby define a plurality of separate individual hydrocarbon reservoir simulation model storage locations. Each of the plurality of individual hydrocarbon reservoir simulation model storage locations, for example, can be associated with one or more hydrocarbon reservoir simulation models. In addition, the one or more of the plurality of individual hydrocarbon reservoir simulation model storage locations can be associated with the hydrocarbon reservoir simulation model associated with the output simulation result file. A method according to an embodiment can also include comparing each of the plurality of output simulation result files to each of the shared simulation files stored in the one or more shared storage locations. Further, a method can include determining when one or more of the plurality of output simulation result files each has a file attribute match with one or more of the shared simulation files. A method can still further include updating the one or more shared storage locations responsive to the plurality of output simulation result files. The updating can include, for example, linking a hydrocarbon reservoir simulation model and one or more shared simulation files when each of the one or more shared simulation files has a file attribute match with one or more of the plurality of output simulation result files associated with the hydrocarbon reservoir simulation model. The updating can also include copying one or more of the plurality of output simulation result files to the one or more shared storage locations when each of the one or more of the plurality of output simulation result files lacks a file attribute match with any of the shared simulation files. The one or more of the plurality of output simulation result files lacking a file attribute match with any of the shared simulation files can thereby define one or more copy simulation files, for example. Further, the updating can also include linking a hydrocarbon reservoir simulation model and each of the one or more copy simulation files associated with the hydrocarbon reservoir simulation model stored in the one or more shared storage locations. A method can then include discarding each of the plurality of output simulation result files stored in the plurality of individual hydrocarbon reservoir simulation model storage locations. Discarding these files can make data storage capacity available to other hydrocarbon reservoir simulation runs and, furthermore, can thereby reduce data storage capacity required for hydrocarbon reservoir simulation runs and failure risks for hydrocarbon reservoir simulation runs.

In some circumstances, each of the plurality of individual hydrocarbon reservoir simulation model storage locations can be configured to store ASCII hydrocarbon reservoir data in one or more ASCII simulation files. The one or more shared storage locations, in contrast, can be configured to store binary hydrocarbon reservoir data in one or more binary shared simulation files and other ASCII hydrocarbon reservoir data in another one or more ASCII shared simulation files. This storage arrangement can thereby isolate binary hydrocarbon reservoir data in the one or more shared storage locations. Further, a method according to an embodiment can further include, for example, altering one or more ASCII shared simulation files associated with a hydrocarbon reservoir simulation model stored in the one or more shared storage locations, responsive to user edit-request action, when each of the one or more ASCII shared simulation files is linked to no more than one hydrocarbon reservoir simulation model. A method can also include copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model. The copied one or more ASCII shared simulation files can thereby define one or more nonexclusive ASCII simulation files, for example. A method can further include linking each of the one or more nonexclusive ASCII simulation files stored in the individual hydrocarbon reservoir simulation model storage location and the associated hydrocarbon reservoir simulation model. A method can still further include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location can thereby isolate edits to the associated hydrocarbon reservoir simulation model to ASCII simulation files stored in the individual hydrocarbon reservoir simulation model storage location.

A method according to an embodiment can further include, for example, linking each of a plurality of simulation files associated with an existing hydrocarbon reservoir simulation model stored in the one or more shared storage locations and a new hydrocarbon reservoir simulation model. As a result, linking simulation files associated with an existing hydrocarbon reservoir simulation model and a new hydrocarbon reservoir simulation model can thereby duplicate the existing hydrocarbon reservoir simulation model, responsive to user duplication-request action.

A method can also include, for example, creating a new hydrocarbon reservoir simulation model, responsive to receipt of hydrocarbon reservoir description data and user creation-request action.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1A:
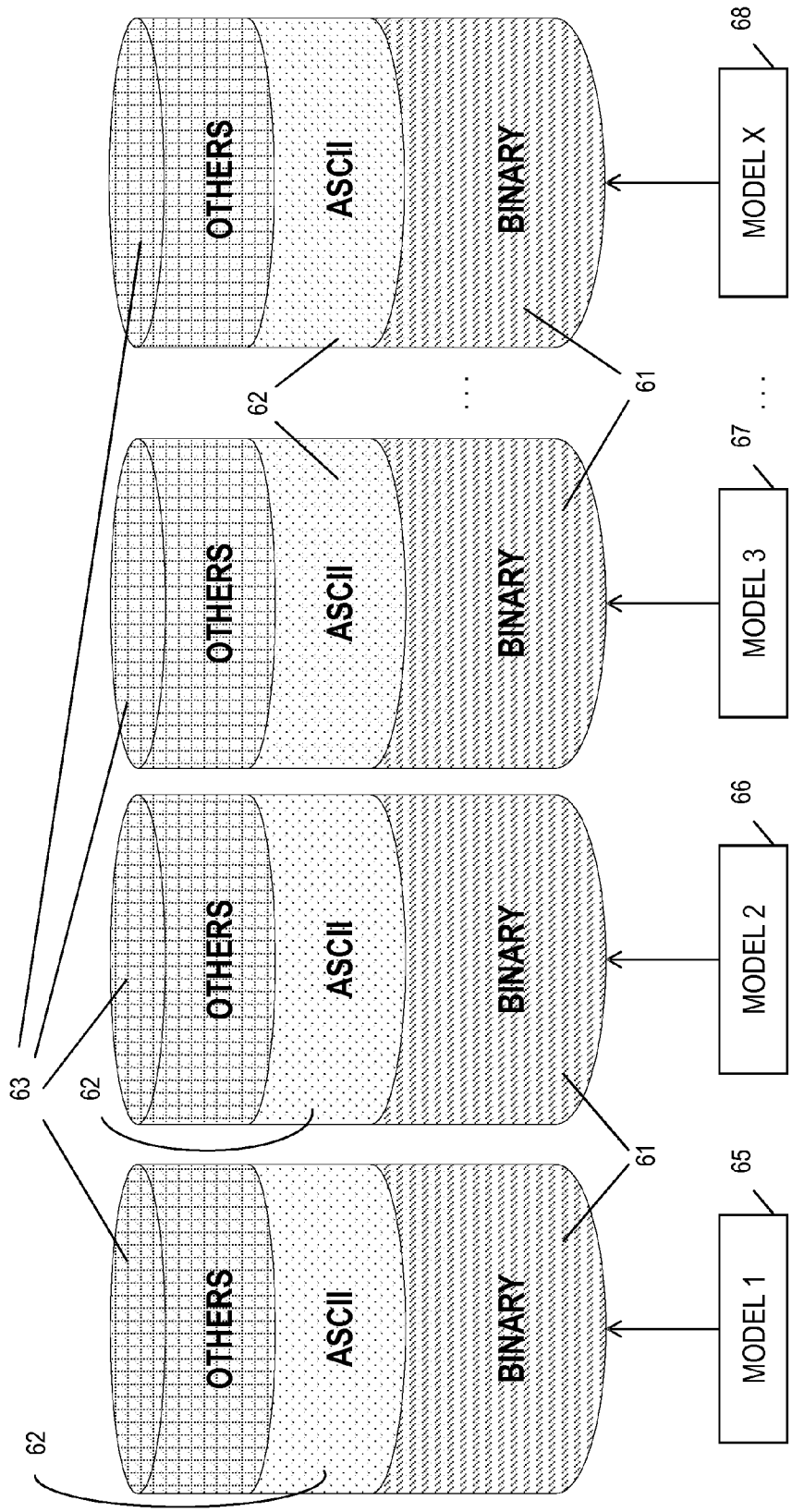
FIG. 1A is a schematic diagram of a data storage configuration according to the prior art.
Figure 1B:
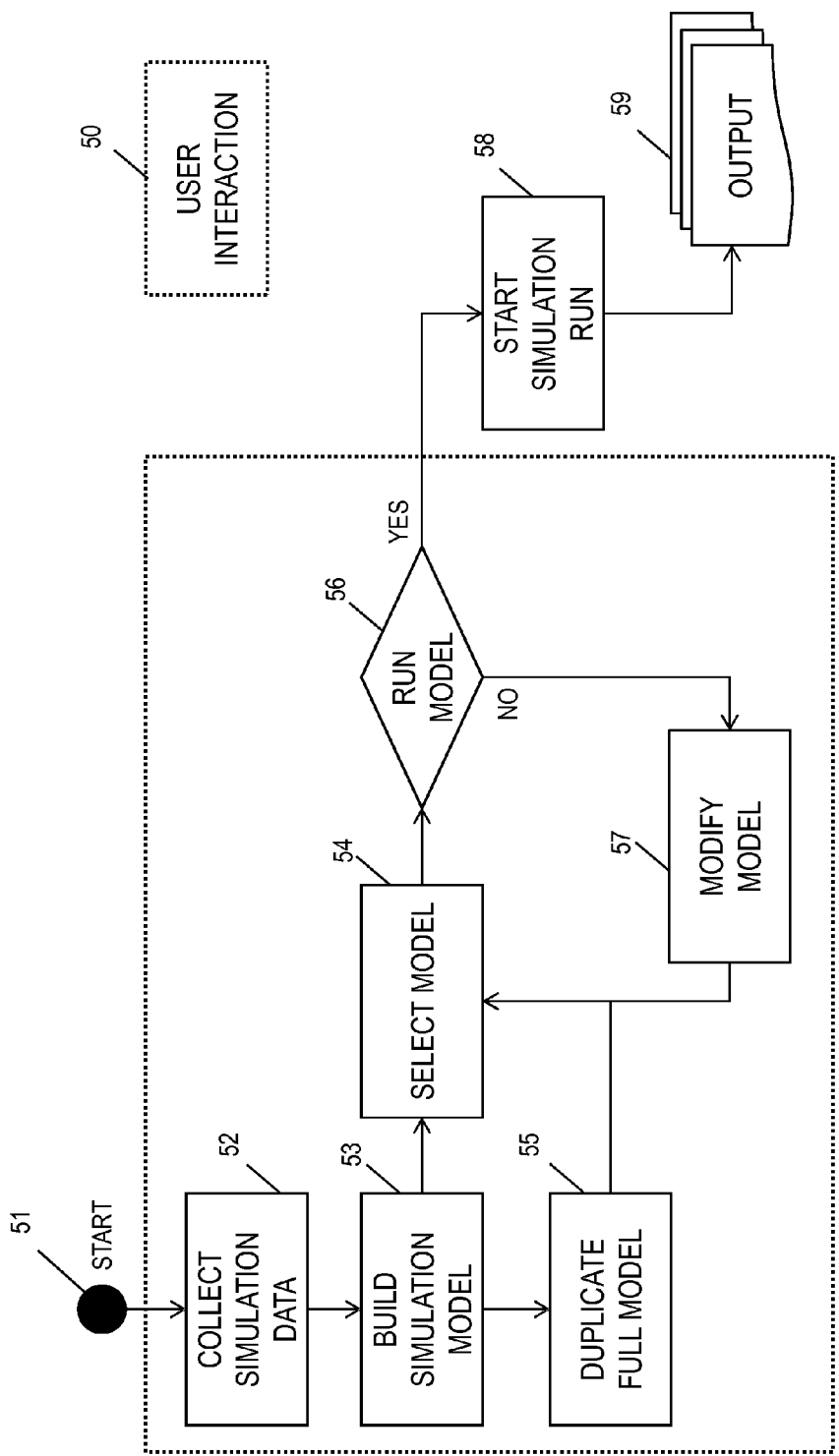
FIG. 1B is a schematic diagram of a method according to the prior art.

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Embodiments of the invention can include systems, computer-implemented methods, and non-transitory computer-readable medium having computer program stored therein to enhance data storage and retrieval during performance of a plurality of hydrocarbon reservoir simulation runs of one or more hydrocarbon reservoir simulation models. Embodiments can enhance the hydrocarbon reservoir simulation process by enhancing data storage management while masking the underlying complexity of efficiently managing storage to users of hydrocarbon reservoir simulations. More specifically, embodiments can optimize data storage management by eliminating some data that is not unique to a single hydrocarbon reservoir simulation model.

For example, embodiments can include a novel algorithm to enhance the hydrocarbon reservoir simulation process where the underlying complexity of efficiently managing storage is masked. The new novel algorithm can optimize storage by eliminating non-unique hydrocarbon reservoir simulation input or output data files for multiple hydrocarbon reservoir simulation models. Further, a user and third-party applications can be unaware of the storage optimization taking place when a hydrocarbon reservoir simulation run is created, duplicated, or submitted. This algorithm can be implemented in the hydrocarbon simulation reservoir environment and can be enforced automatically. In addition, the algorithm can ensure seamless integration with post-simulation analysis tools, including, for example, three-dimensional visualization, well plotting, etc. The algorithm can include, for instance, (1) optimizing binary hydrocarbon reservoir simulation input data for multiple hydrocarbon reservoir simulation runs by using single unique files and utilizing file links for multiple hydrocarbon reservoir simulation runs. The algorithm can also include (2) optimizing ASCII hydrocarbon reservoir simulation input data for multiple hydrocarbon reservoir simulation runs by using file links and only creating a copy of the data when modification is required. Further, the algorithm can include (3) optimizing binary output data for multiple hydrocarbon reservoir simulation runs by using single unique files and utilizing file links for multiple hydrocarbon reservoir simulation runs. As a result, each hydrocarbon reservoir simulation run can have a copy of, or link to, the simulation input data related to the simulation run. Utilizing file links for multiple hydrocarbon reservoir simulation runs, for example, can enable an entity to keep a record-keeping trail to trace or track, e.g., audit, the relationships between (a) a given simulation run and the simulation run's output and (b) the input to the simulation run. Such a record-keeping trail, however, is not required.

A need to reduce and optimize the amount of storage systems in an entity's computer center can exist for several reasons. For example, the amount of disk space required for reservoir simulation can be increasing at an exponential rate. In addition, a computer center of an entity can be running out of required electrical power to support the additional required storage infrastructure. Embodiments can accordingly help in reducing the storage capacity in a computer center, which can in turn reduce power consumption, cooling, and support requirements and thereby lead to significant cost avoidance.

Figure 2:
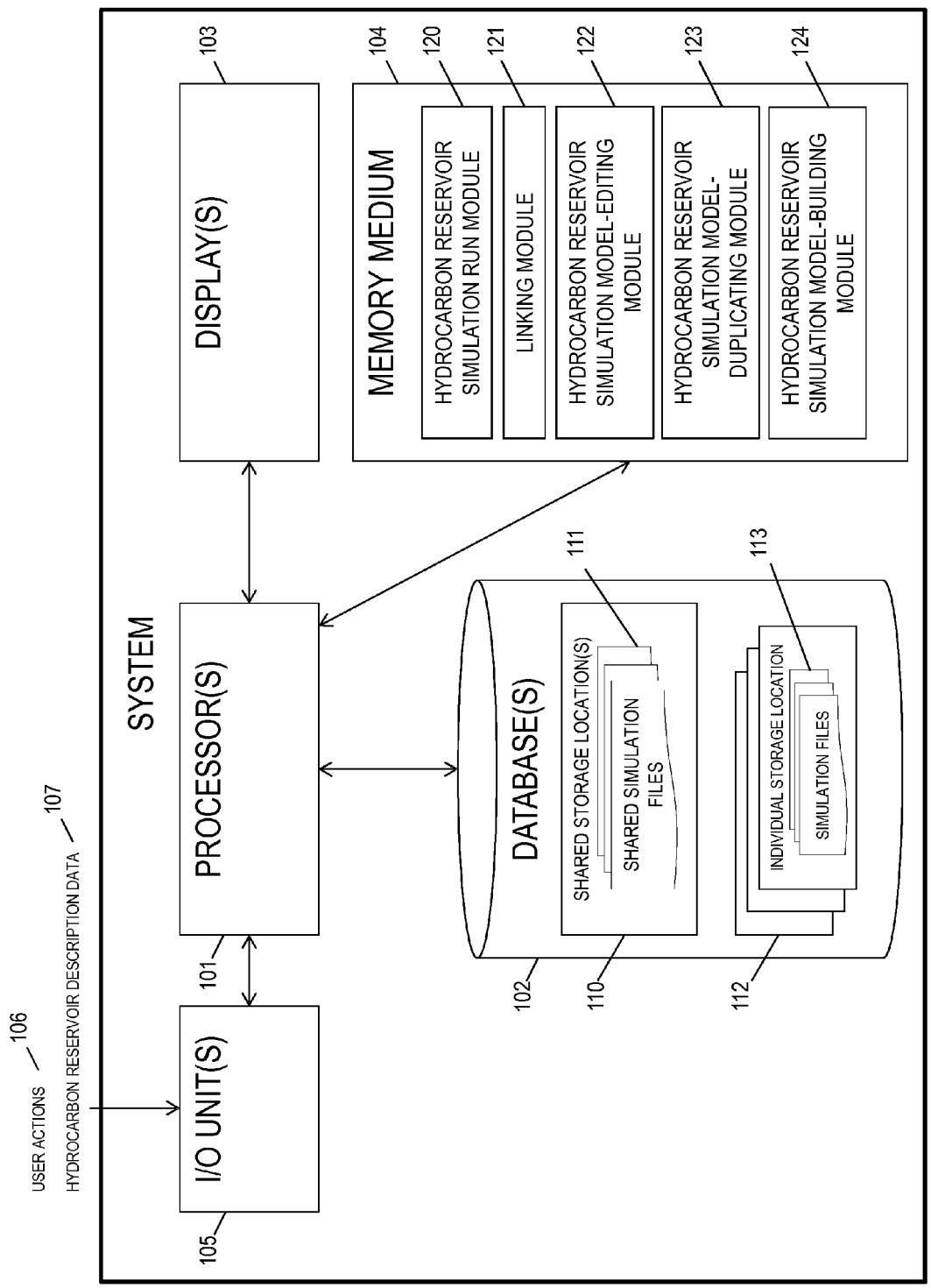
FIG. 2 is a schematic diagram of a system according to an embodiment of the invention.

For example, a system to enhance data storage and retrieval during performance of a plurality of hydrocarbon reservoir simulation runs of one or more hydrocarbon reservoir simulation models, according to an embodiment, can include one or more processors 101, one or more displays 103 in communication with the one or more processors 101, and one or more databases 102 in communication with the one or more processors 101, as illustrated, for example, in FIG. 2. The one or more databases 102 can furthermore include a plurality of separate individual hydrocarbon reservoir simulation model storage locations 112, for example. Each of the plurality of individual hydrocarbon reservoir simulation model storage locations 112 can be associated with one or more hydrocarbon reservoir simulation models. Further, each of the plurality of individual hydrocarbon reservoir simulation model storage locations 112 can be configured to store one or more simulation files 113 that are associated with the one or more hydrocarbon reservoir simulation models associated with the individual hydrocarbon reservoir simulation model storage location. The one or more databases 102 can also include one or more other storage locations, separate from the plurality of individual hydrocarbon reservoir simulation model storage locations 102. The one or more other storage locations, for example, can have a plurality of simulation files stored therein. The one or more other storage locations can also be configured to share the plurality of simulation files among the one or more hydrocarbon reservoir simulation models and can thereby define one or more shared storage locations 110. Further, the plurality of simulation files being shared among the one or more hydrocarbon reservoir simulation models being stored in the one or more shared locations 110 can also define shared simulation files 111, for example. A system can also include non-transitory memory medium 104 in communication with the one or more processors 101. The memory medium 104, for example, can include a hydrocarbon reservoir simulation run module 120 and a linking module 121.

The hydrocarbon reservoir simulation run module 120 can include computer-readable instructions stored therein that when executed cause the system to perform a series of steps. The steps can include, for example, initiating a plurality of hydrocarbon reservoir simulation runs of one or more hydrocarbon reservoir simulation models, responsive to user run-request action. The steps can further include retrieving, for two or more of the plurality of hydrocarbon reservoir simulation runs, a selected one of the one or more shared simulation files 111 from the one or more shared storage locations 110. The selected one of the one or more shared simulation files 111 can be for use as an input simulation file during the two or more of the plurality of hydrocarbon reservoir simulation runs. In addition, the selected one of the one or more simulation files can be the same of the one or more shared simulation files. The steps can also include completing each of the plurality of hydrocarbon reservoir simulation runs, responsive to the retrieved same one of the one or more shared simulation files 111. Further, the steps can include producing a plurality of output simulation result files associated with and responsive to each of the plurality of hydrocarbon reservoir simulation runs. Each of the plurality of output simulation result files can be associated with a hydrocarbon reservoir simulation model. The steps can also include storing each output simulation result file in one or more of the plurality of individual hydrocarbon reservoir simulation model storage locations 112. More specifically, the one or more of the plurality of individual hydrocarbon reservoir simulation model storage locations 112 can be associated with the hydrocarbon reservoir simulation model associated with the output simulation result file.

The linking module 121 can also include computer-readable instructions stored therein that when executed cause the system to perform a series of steps. The steps of the linking module 121 can include, for example, comparing each of a plurality of output simulation result files to each of the shared simulation files stored in the one or more shared storage locations 110. The steps can also include determining when one or more of the plurality of output simulation result files each has a file attribute match with one or more of the shared simulation files 111. Further, the steps can include updating the one or more shared storage locations 110, responsive to the plurality of output simulation result files. For example, the updating can include linking a hydrocarbon reservoir simulation model and one or more shared simulation files 111 when each of the one or more shared simulation files 111 has a file attribute match with one or more of the plurality of output simulation result files associated with the hydrocarbon reservoir simulation model. The updating can further include copying one or more of the plurality of output simulation result files to the one or more shared storage locations 110 when each of the one or more of the plurality of output simulation result files lacks a file attribute match with any of the shared simulation files 111. In addition, the one or more of the plurality of output simulation result files lacking a file attribute match with any of the shared simulation files 111 can thereby define one or more copy simulation files. The updating can also include linking a hydrocarbon reservoir simulation model and each of the one or more copy simulation files associated with the hydrocarbon reservoir simulation model stored in the one or more shared storage locations 110. In some circumstances, linking can include use of a UNIX hard link to ensure validity of existing models, for instance. The steps of the linking module 121 can then include, for example, discarding each of the plurality of output simulation result files stored in the plurality of individual hydrocarbon reservoir simulation model storage locations 112. Notably, discarding the output simulation result files stored in the plurality of individual hydrocarbon reservoir simulation model storage locations 112 can make data storage capacity available to other hydrocarbon reservoir simulation runs. Moreover, discarding the output simulation result files stored in the plurality of individual hydrocarbon reservoir simulation model storage locations 112 can thereby reduce data storage capacity required for hydrocarbon reservoir simulation runs and failure risks for hydrocarbon reservoir simulation runs. Consequently, deduplication can occur at the end of a simulation process, for example, rather than as data is being stored in a file system.

In some systems according to an embodiment, each of the plurality of individual hydrocarbon reservoir simulation model storage locations 112 can be associated with an individual hydrocarbon reservoir simulation model. In addition, each individual hydrocarbon reservoir simulation model can be separate from other hydrocarbon reservoir simulation models and also associated with a set of hydrocarbon reservoir description data. Although each set of hydrocarbon reservoir description data can be associated with a hydrocarbon reservoir, a hydrocarbon reservoir can be associated with one or more sets of hydrocarbon reservoir description data. Furthermore, two or more hydrocarbon reservoir simulation models can each be associated with one set of hydrocarbon reservoir description data, even though the two or more hydrocarbon reservoir simulation models remain separate, individual hydrocarbon reservoir simulation models.

Hydrocarbon reservoir simulation input data, in some circumstances, can include a combination of binary and ASCII data that can generated by using third-party simulation preprocessing tools or manually by using text editors, for example. For example, frequently shared storage input data types, as will be understood by those skilled in the art, can include: (1) geological model data (static data), in binary or ASCII format, including geometrical information and static reservoir properties, for instance; (2) historical well production and injection data (dynamic data), in ASCII format; (3) relative permeability data, in ASCII format; (4) PVT analysis, in ASCII format; (5) well and facility configuration data, in ASCII format; and (6) model control data, in ASCII format. Likewise, hydrocarbon reservoir simulation output data can include a combination of binary and ASCII data and can be generated by a simulator, as will be understood by those skilled in the art. For example, frequently shared storage output data types, as will be understood by those skilled in the art, can include: (1) grid file data, in binary format; (2) static reservoir property data, in binary format; (3) dynamic reservoir property data, in binary format; (4) well information data, in binary format; and (5) simulator log file data, in ASCII format.

Advantageously, each of the plurality of individual hydrocarbon reservoir simulation model storage locations 112 can be configured to store ASCII hydrocarbon reservoir data in one or more ASCII simulation files, for example. Further, the one or more shared storage locations 110 can be configured to store binary hydrocarbon reservoir data in one or more binary shared simulation files and other ASCII hydrocarbon reservoir data in another one or more ASCII shared simulation files. As a result, binary hydrocarbon reservoir data can be isolated in the one or more shared storage locations 110.

Figure 3:
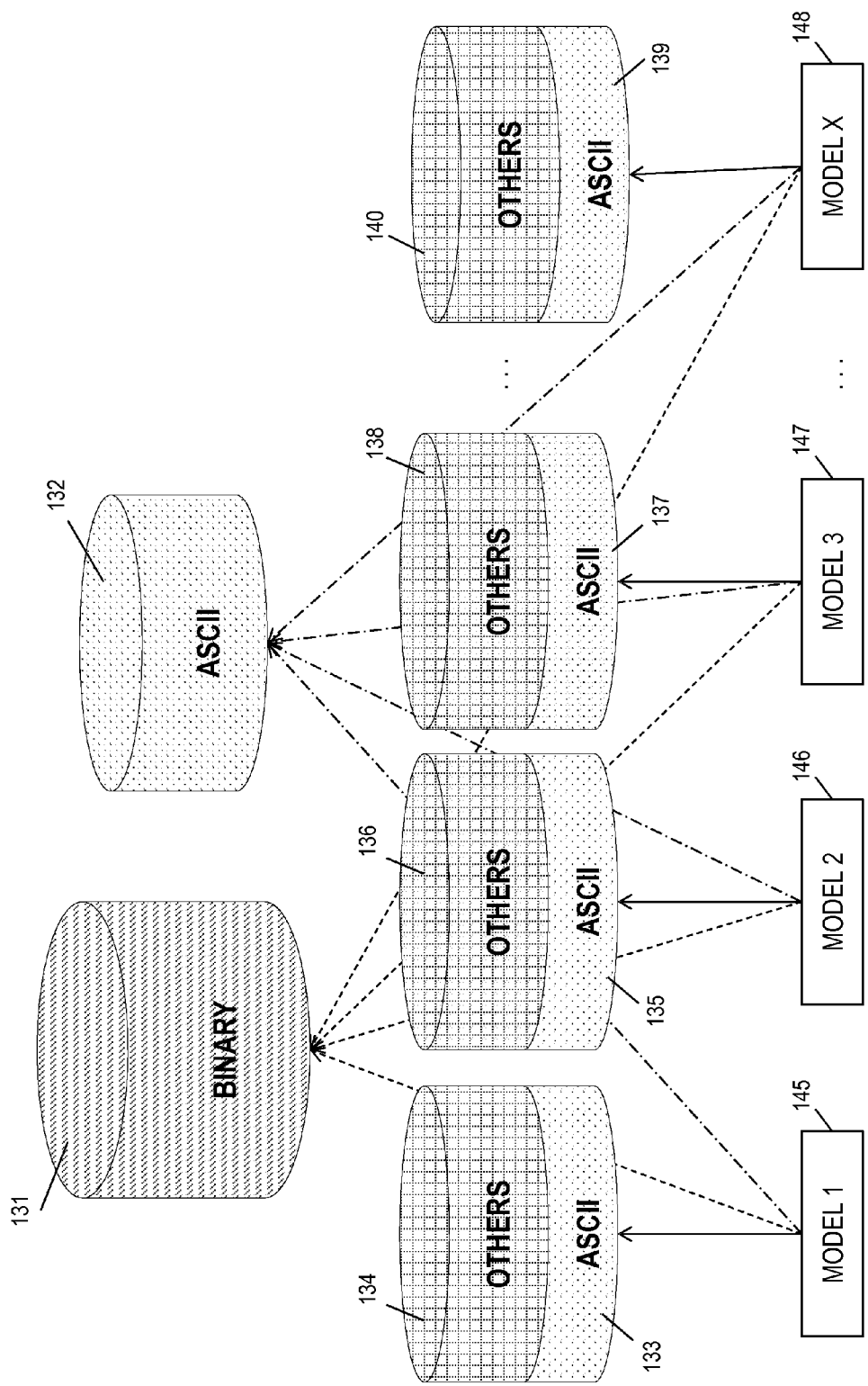
FIG. 3 is a schematic diagram of a data storage configuration according to an embodiment of the invention.

For example, as illustrated in FIG. 3, a hydrocarbon reservoir simulation model 1 145, a hydrocarbon reservoir simulation model 2 146, a hydrocarbon reservoir simulation model 3 147, and other hydrocarbon reservoir simulation models through a hydrocarbon reservoir simulation model X 148 can be linked to binary hydrocarbon reservoir data 131 in the one or more shared simulation storage locations 110, in an exemplary hydrocarbon reservoir simulation input file layout after implementation of storage optimization according to embodiments. Each of the hydrocarbon reservoir simulation models 145, 146, 147, and 148 can also be linked to ASCII hydrocarbon reservoir data 132 in the one or more shared storage locations 110. However, each of the hydrocarbon reservoir simulation models 145, 146, 147, and 148 can additionally be linked to ASCII hydrocarbon reservoir data and other data in the individual hydrocarbon reservoir simulation model storage location associated with each hydrocarbon reservoir simulation model. That is, hydrocarbon reservoir simulation model 1 145 can be linked to ASCII hydrocarbon reservoir data 133 and other hydrocarbon reservoir data 134 stored in the individual hydrocarbon reservoir simulation model storage location associated with hydrocarbon reservoir simulation model 1 145. Similarly, hydrocarbon reservoir simulation model 2 146 can be linked to ASCII hydrocarbon reservoir data 135 and other hydrocarbon reservoir data 136 stored in the individual hydrocarbon reservoir simulation model storage location associated with hydrocarbon reservoir simulation model 2 146. In addition, hydrocarbon reservoir simulation model 3 147 can be linked to ASCII hydrocarbon reservoir data 137 and other hydrocarbon reservoir data 138 stored in the individual hydrocarbon reservoir simulation model storage location associated with hydrocarbon reservoir simulation model 3 147. Further, hydrocarbon reservoir simulation model X 148 can be linked to ASCII hydrocarbon reservoir data 139 and other hydrocarbon reservoir data 140 stored in the individual hydrocarbon reservoir simulation model storage location associated with hydrocarbon reservoir simulation model X 148. In this example, a single unique binary data set 131 can be used for all hydrocarbon reservoir simulation models, and the ASCII input files for hydrocarbon reservoir simulation data can be different only based on user modification. Consequently, binary hydrocarbon reservoir data 131 can be isolated in the one or more shared storage locations 110.

Figure 4:
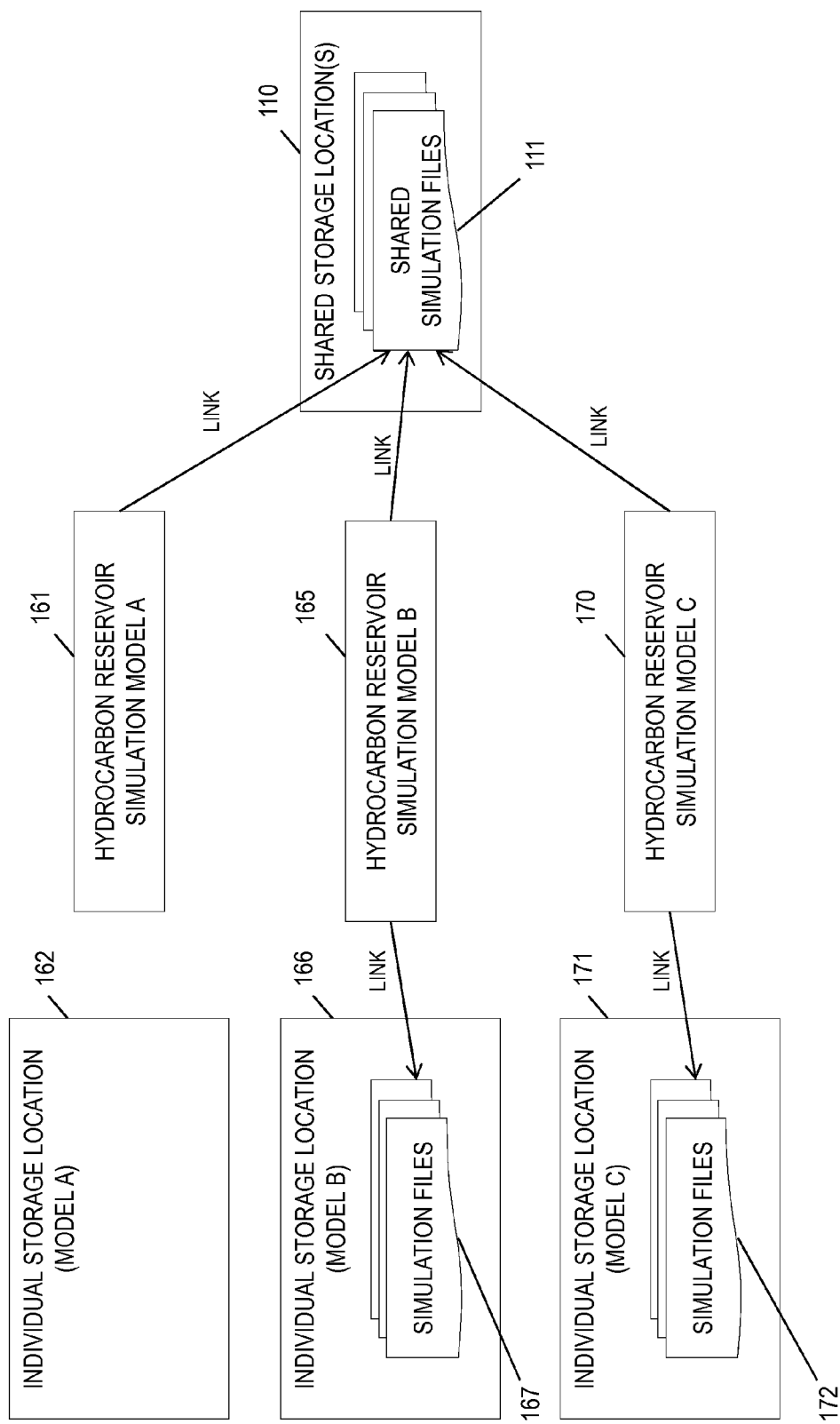
FIG. 4 is a schematic diagram of a data storage configuration according to an embodiment of the invention.

An exemplary storage configuration is further illustrated in FIG. 4, for example. As depicted, hydrocarbon reservoir simulation model A 161 is linked to one or more of the shared simulation files 111 in the one or more shared storage locations 110. As depicted in FIG. 4, hydrocarbon reservoir simulation model A 161 is not linked to any simulation files in the individual hydrocarbon reservoir simulation model storage location 162 associated with hydrocarbon reservoir simulation model A 161. In contrast, hydrocarbon reservoir simulation model B 165 is linked to one or more simulation files 167 in the individual hydrocarbon reservoir simulation model storage location 166 associated with hydrocarbon reservoir simulation model B 165. Hydrocarbon reservoir simulation model B 165, however, is also linked to one or more of the shared simulation files 111 in the one or more shared storage locations 110. Similarly, hydrocarbon reservoir simulation model C 170 is linked to one or more of the shared simulation files 111 in the one or more shared storage locations 110, but it is also linked to one or more simulation files 172 in the individual hydrocarbon reservoir simulation model storage location 171 associated with hydrocarbon reservoir simulation model C 170. Although an example is illustrated in FIG. 4, each hydrocarbon reservoir simulation model can be linked to one or more simulation files in one of the plurality of individual hydrocarbon reservoir simulation model storage locations. Alternatively, none of the hydrocarbon reservoir simulation models can be linked to one or more simulation files in one of the plurality of individual hydrocarbon reservoir simulation model storage locations, in some circumstances.

A system according to an embodiment can further include one or more input and output units 105 in communication with the one or more processors 101. The one or more input and output units 105 can also be positioned to receive as input one or more user actions 106. Further, the memory medium 104 can also include a hydrocarbon reservoir simulation model-editing module 122, for example, that includes computer-readable instructions stored therein that when executed cause the system to perform a series of steps. The steps, for example, can include altering one or more ASCII shared simulation files associated with a hydrocarbon reservoir simulation model stored in the one or more shared storage locations 101—responsive to user edit-request action through the one or more input and output units 105—when each of the one or more ASCII shared simulation files is linked to no more than one hydrocarbon reservoir simulation model. The steps can also include copying for editing use one or more ASCII shared simulation files associated with a hydrocarbon reservoir simulation model from the one or more shared storage locations 110 to the individual hydrocarbon reservoir simulation model storage location associated with the hydrocarbon reservoir simulation model, responsive to user edit-request action through the one or more input and output units 105, when each of the one or more ASCII shared simulation files is linked to more than one hydrocarbon reservoir simulation model. The copied one or more ASCII shared simulation files can thereby define one or more nonexclusive ASCII simulation files, for instance. The steps can further include linking each of the one or more nonexclusive ASCII simulation files stored in the individual hydrocarbon reservoir simulation model storage location and the associated hydrocarbon reservoir simulation model. The steps can also include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location can thereby isolate edits to the associated hydrocarbon reservoir simulation model to ASCII simulation files stored in the individual hydrocarbon reservoir simulation model storage location.

Similarly, in a system according to an embodiment in which the system further includes one or more input and output units 105 in communication with the one or more processors 101 and positioned to receive as input one or more user actions 106, the memory medium 104 can further include a hydrocarbon reservoir simulation model-duplicating module 123, for example. The hydrocarbon reservoir simulation model-duplicating module 123 can include computer-readable instructions stored therein that when executed cause the system to perform the step of linking each of a plurality of simulation files associated with an existing hydrocarbon reservoir simulation model stored in the one or more shared storage locations 110 and a new hydrocarbon reservoir simulation model, responsive to user duplication-request action through the one or more input and output units 105. Consequently, linking each of the plurality of simulation files associated with an existing hydrocarbon reservoir simulation model and a new hydrocarbon reservoir simulation model can thereby duplicate the existing hydrocarbon reservoir simulation model.

Furthermore, in a system according to an embodiment in which the system further includes one or more input and output units 105, the one or more input and output units 105 can be in communication with the one or more processors 101 and positioned to receive as input one or more sets of hydrocarbon reservoir description data 107, in addition to one or more user actions 106. The memory medium 104 can also further include a hydrocarbon reservoir simulation model-building module 124, for example. The hydrocarbon reservoir simulation model-building module 124 can include computer-readable instructions stored therein that when executed cause the system to perform the step of creating a new hydrocarbon reservoir simulation model responsive to receipt of hydrocarbon reservoir description data 107 and user creation-request action through the one or more input and output units 105.

In some circumstances, a file attribute match can include substantially similar metadata and equal checksums, and metadata can include file size and file type. For example, metadata can be used as an initial filter to speed up a determination of when one or more of the plurality of output simulation result files each has a file attribute match. A file attribute match also can relate to the number of cells or the number of wells, for instance. Additionally, the plurality of output simulation result files can be simulation files.

Figure 1C:
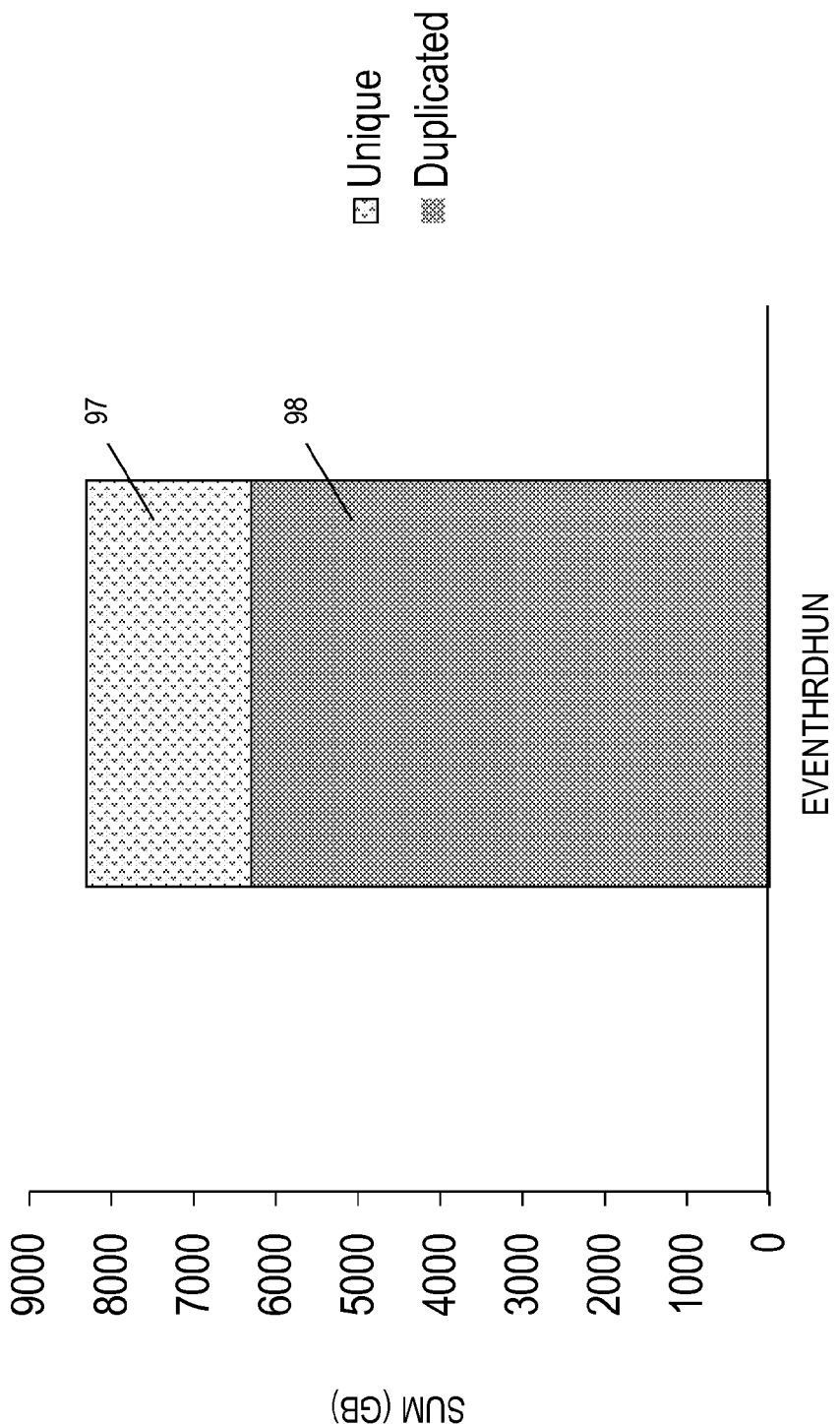
FIG. 1C is a bar graph of unique and duplicated data storage according to the prior art.
Figure 1D:
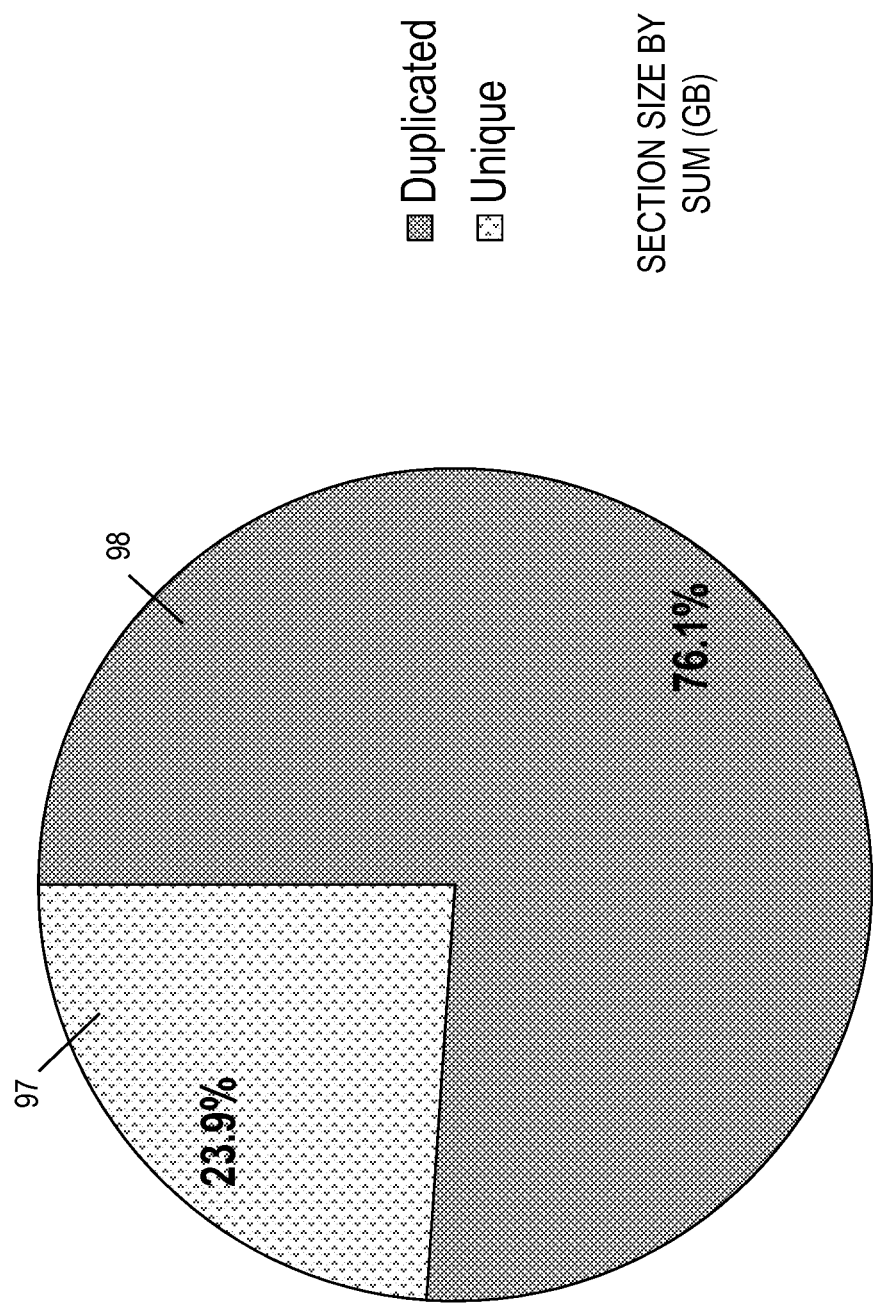
FIG. 1D is a pie chart of unique and duplicated data storage according to the prior art.

A system according to an embodiment can also have, for example, a predetermined limit on data storage capacity. Further, operation of the linking module 121 for a hydrocarbon reservoir simulation run can reduce data storage capacity required for the hydrocarbon reservoir simulation run to thereby reduce time required to complete a plurality of hydrocarbon reservoir simulation runs. A reduction in data storage capacity required for a hydrocarbon reservoir simulation run can be particularly advantageous, for example, to an entity that performs a large volume of hydrocarbon reservoir simulation runs and must store all of the accompanying data. For example, more than three-quarters of an entity's storage capacity can be dedicated to duplicated data, in some circumstances, as illustrated in FIG. 1C and FIG. 1D, for instance. Use of an embodiment of the invention, however, can eliminate duplicated data by deleting non-unique files and employing links to unique files. Consequently, embodiments can in some circumstances make approximately 75% of an entity's data storage capacity available to other data and hydrocarbon reservoir simulation runs.

To further illustrate advantages of embodiments of the invention, consider an example of a data input optimization process and an example of a data output optimization process. In the exemplary input optimization process, for example, ten simulation cases with 40 million cells can require an input of 6.3 GB of storage for each model according to the prior art. The total amount of storage required, in that case, will be 63 GB of storage for the ten models. Only 20 MB of storage per model—for a total of 6.5 GB—can be required according to an embodiment of the invention, for example. Likewise, in the exemplary output optimization process, ten simulation cases with 40 million cells can require an output of 38 GB of storage for each model according to the prior art. The total, in that case, will be 380 GB of storage for the ten models. However, only 26 GB of storage per model can be required according to an embodiment, for a total of 260 GB in comparison to 380 GB of storage.

Advantageously, embodiments can thus allow an entity to overcome exponential simulation data growth and allow simulation engineers to generate more studies utilizing the same storage capacity. In addition, embodiments can reduce simulation job failures that are due to unavailability of sufficient storage. Consequently, embodiments can enable an entity to save on high performance storage by at least ten percent (10%). A ten percent (10%) savings on high performance storage can further translate to more than $100,000 per year in savings related to storage cost alone. In addition, this estimate does not necessarily consider savings that can be gained by other infrastructure savings (e.g., network, electrical power, cooling, IT support), reducing job failure rates, and enabling engineers to run larger simulation models for hydrocarbon reservoir fields that can in turn lead to more accurate business decisions.

Advantageously, embodiments can work on a controlled environment with known scenarios and conditions for removing redundancy. Embodiments can ensure minimum time needed to investigate for potential reservoir simulation data elimination, as files under search can be controlled by reservoir simulation processes.

Embodiments can also include non-transitory computer-readable medium having one or more computer programs stored therein. For example, non-transitory computer-readable medium having one or more computer programs stored therein operable by one or more processors according to an embodiment can enhance data storage and retrieval during performance of a plurality of hydrocarbon reservoir simulation runs of one or more hydrocarbon reservoir simulation models. The one or more computer programs can include a set of instructions that, when executed by the one or more processors, cause the one or more processors to perform a series of operations. For example, the operations can include initiating a plurality of hydrocarbon reservoir simulation runs of one or more hydrocarbon reservoir simulation models, responsive to user run-request action. The operations can also include retrieving—for two or more of the plurality of hydrocarbon reservoir simulation runs—a selected one of one or more simulation files from one or more storage locations for use as an input simulation file during the two or more of the plurality of hydrocarbon reservoir simulation runs. The one or more storage locations can be configured to share a plurality of simulation files among the one or more hydrocarbon reservoir simulation models and can thereby define one or more shared storage locations 110, for example. Further, the plurality of simulation files being shared among the one or more hydrocarbon reservoir simulation models being stored in the one or more shared locations 110 can define shared simulation files 111. In addition, the selected one of the one or more simulation files can be the same of the one or more shared simulation files 111.

The operations can further include, for example, completing each of the plurality of hydrocarbon reservoir simulation runs, responsive to the retrieved same one of the one or more shared simulation files 111. Additionally, the operations can include producing a plurality of output simulation result files associated with and responsive to each of the plurality of hydrocarbon reservoir simulation runs. Each of the plurality of output simulation result files can be associated with a hydrocarbon reservoir simulation model. The operations can also include storing each output simulation result file in one or more of a plurality of other storage locations. The one or more of a plurality of other storage locations can thereby define a plurality of separate individual hydrocarbon reservoir simulation model storage locations 112, for example. Further, each of the plurality of individual hydrocarbon reservoir simulation model storage locations can be associated with one or more hydrocarbon reservoir simulation models. In addition, the one or more of the plurality of individual hydrocarbon reservoir simulation model storage locations 112 can be associated with the hydrocarbon reservoir simulation model that is associated with the output simulation result file.

The operations can still further include comparing each of the plurality of output simulation result files to each of the shared simulation files 111 stored in the one or more shared storage locations 110. Additionally, the operations can include determining when one or more of the plurality of output simulation result files each has a file attribute match with one or more of the shared simulation files 111. The operations can also include updating the one or more shared storage locations 110, responsive to the plurality of output simulation result files. The updating can include, for example, linking a hydrocarbon reservoir simulation model and one or more shared simulation files 111 when each of the one or more shared simulation files 111 has a file attribute match with one or more of the plurality of output simulation result files associated with the hydrocarbon reservoir simulation model. The updating can also include copying one or more of the plurality of output simulation result files to the one or more shared storage locations 110 when each of the one or more of the plurality of output simulation result files lacks a file attribute match with any of the shared simulation files 111. The one or more of the plurality of output simulation result files lacking a file attribute match with any of the shared simulation files 111 can thereby define one or more copy simulation files, as well. The updating can also include linking a hydrocarbon reservoir simulation model and each of the one or more copy simulation files associated with the hydrocarbon reservoir simulation model stored in the one or more shared storage locations 110. Further, the operations can also include discarding each of the plurality of output simulation result files stored in the plurality of individual hydrocarbon reservoir simulation model storage locations 112. Discarding each of the plurality of output simulation result files stored in the plurality of individual hydrocarbon reservoir simulation model storage locations 112 can make data storage capacity available to other hydrocarbon reservoir simulation runs. Discarding each of the plurality of output simulation result files stored in the plurality of individual hydrocarbon reservoir simulation model storage locations 112 can also thereby reduce data storage capacity required for hydrocarbon reservoir simulation runs and failure risks for hydrocarbon reservoir simulation runs.

In some circumstances, each of the plurality of individual hydrocarbon reservoir simulation model storage locations 112 can be associated with an individual hydrocarbon reservoir simulation model. Further, each individual hydrocarbon reservoir simulation model can be separate from other hydrocarbon reservoir simulation models, and each hydrocarbon reservoir simulation model can be associated with a set of hydrocarbon reservoir description data. However, two or more hydrocarbon reservoir simulation models can each be associated with one set of hydrocarbon reservoir description data. In addition, although each set of hydrocarbon reservoir description data can be associated with a hydrocarbon reservoir, a hydrocarbon reservoir can be associated with one or more sets of hydrocarbon reservoir description data.

Additionally, in some circumstances, each of the plurality of individual hydrocarbon reservoir simulation model storage locations 112 can be configured to store ASCII hydrocarbon reservoir data in one or more ASCII simulation files. Further, the one or more shared storage locations 110 can be configured to store binary hydrocarbon reservoir data in one or more binary shared simulation files and other ASCII hydrocarbon reservoir data in another one or more ASCII shared simulation files. This storage arrangement can thereby isolate binary hydrocarbon reservoir data in the one or more shared storage locations 110. In some non-transitory computer-readable medium having one or more computer programs according to an embodiment, the set of instructions, when executed by the one or more processors, can further cause the one or more processors to perform additional operations. The operations can include, for example, altering one or more ASCII shared simulation files associated with a hydrocarbon reservoir simulation model stored in the one or more shared storage locations 110, responsive to user edit-request action, when each of the one or more ASCII shared simulation files is linked to no more than one hydrocarbon reservoir simulation model. The operations can also include copying for editing use one or more ASCII shared simulation files associated with a hydrocarbon reservoir simulation model from the one or more shared storage locations 110 to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model. The copied one or more ASCII shared simulation files can thereby define one or more nonexclusive ASCII simulation files. In addition, the operations can further include linking each of the one or more nonexclusive ASCII simulation files stored in the individual hydrocarbon reservoir simulation model storage location and the associated hydrocarbon reservoir simulation model. The operations can still further include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location, for example, can thereby isolate edits to the associated hydrocarbon reservoir simulation model to ASCII simulation files stored in the individual hydrocarbon reservoir simulation model storage location.

In some non-transitory computer-readable medium having one or more computer programs stored therein according to an embodiment, the set of instructions, when executed by the one or more processors, can further cause the one or more processors to perform the operation of linking each of a plurality of simulation files associated with an existing hydrocarbon reservoir simulation model stored in the one or more shared storage locations 110 and a new hydrocarbon reservoir simulation model, responsive to user duplication-request action. Linking the simulation files associated with an existing hydrocarbon reservoir simulation model and a new hydrocarbon reservoir simulation model can thereby duplicate the existing hydrocarbon reservoir simulation model.

Likewise, in some non-transitory computer-readable medium having one or more computer programs stored therein according to an embodiment, the set of instructions, when executed by the one or more processors, can further cause the one or more processors to perform the operation of creating a new hydrocarbon reservoir simulation model responsive to receipt of hydrocarbon reservoir description data and user creation-request action.

In some circumstances, a file attribute match can include substantially similar metadata and equal checksums, and metadata can include file size and file type. Additionally, the plurality of output simulation result files can be simulation files.

In some circumstances, the one or more shared storage locations 110 and the plurality of separate individual hydrocarbon reservoir simulation model storage locations 112 can have a predetermined collective limit on data storage capacity. Further, some operations—including, for example, updating the one or more shared storage locations 110 responsive to the plurality of output simulation files associated with a hydrocarbon reservoir simulation run and discarding each of the plurality of output simulation result files stored in the individual hydrocarbon reservoir simulation model storage location associated with the hydrocarbon reservoir simulation model of the hydrocarbon reservoir simulation run—can reduce data storage capacity required for the hydrocarbon reservoir simulation run. Reducing data storage capacity required for the hydrocarbon reservoir simulation run, furthermore, can thereby reduce time required to complete a plurality of hydrocarbon reservoir simulation runs.

Figure 6:
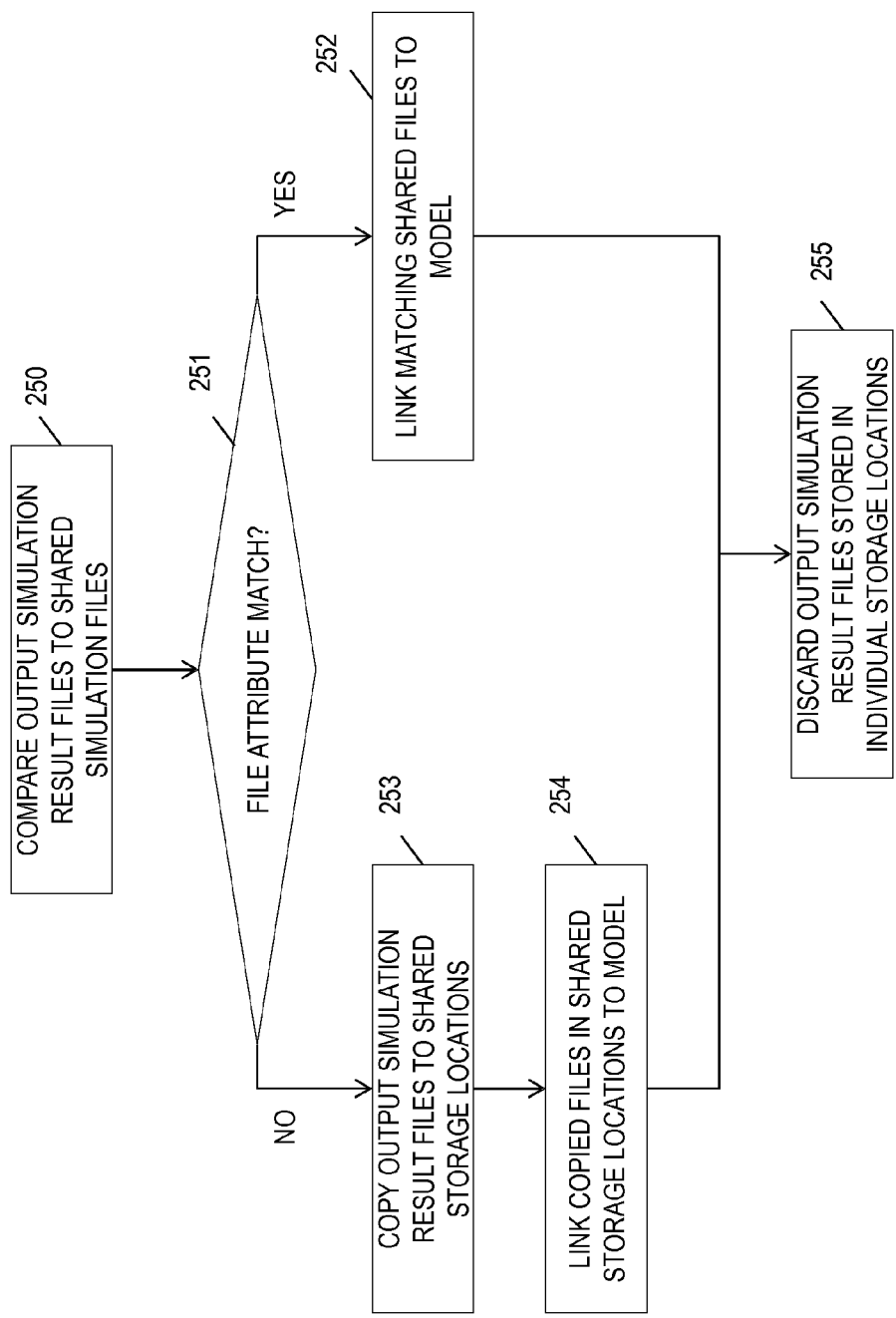
FIG. 6 is a schematic diagram of a method according to an embodiment of the invention.

An embodiment can also include a computer-implemented method to enhance data storage and retrieval during performance of a plurality of hydrocarbon reservoir simulation runs of one or more hydrocarbon reservoir simulation models, for example. A method can include, for instance, initiating a plurality of hydrocarbon reservoir simulation runs of one or more hydrocarbon reservoir simulation models, responsive to user run-request action. Further, a method can include retrieving, for two or more of the plurality of hydrocarbon reservoir simulation runs, a selected one of one or more simulation files from one or more storage locations for use as an input simulation file during the two or more of the plurality of hydrocarbon reservoir simulation runs. The one or more storage locations configured to share a plurality of simulation files among the one or more hydrocarbon reservoir simulation models, for example, can thereby define one or more shared storage locations 110. Similarly, the plurality of simulation files being shared among the one or more hydrocarbon reservoir simulation models being stored in the one or more shared locations 110 can also define shared simulation files 111. The selected one of the one or more simulation files can also be the same of the one or more shared simulation files 111. A method can also include completing each of the plurality of hydrocarbon reservoir simulation runs, responsive to the retrieved same one of the one or more shared simulation files. Further, a method can include producing a plurality of output simulation result files associated with and responsive to each of the plurality of hydrocarbon reservoir simulation runs. Each of the plurality of output simulation result files, for example, can be associated with a hydrocarbon reservoir simulation model. A method can still further include storing each output simulation result file in one or more of a plurality of other storage locations, which can thereby define a plurality of separate individual hydrocarbon reservoir simulation model storage locations 112. Each of the plurality of individual hydrocarbon reservoir simulation model storage locations 112, for example, can be associated with one or more hydrocarbon reservoir simulation models. In addition, the one or more of the plurality of individual hydrocarbon reservoir simulation model storage locations 112 can be associated with the hydrocarbon reservoir simulation model associated with the output simulation result file. A method according to an embodiment can also include comparing 250 each of the plurality of output simulation result files to each of the shared simulation files 111 stored in the one or more shared storage locations 110, as illustrated, for example, in FIG. 6. Further, a method can include determining 251 when one or more of the plurality of output simulation result files each has a file attribute match with one or more of the shared simulation files 111. A method can still further include updating the one or more shared storage locations 110 responsive to the plurality of output simulation result files. The updating can include, for example, linking 252 one or more shared simulation files 111 and a hydrocarbon reservoir simulation model when each of the one or more shared simulation files 111 has a file attribute match with one or more of the plurality of output simulation result files associated with the hydrocarbon reservoir simulation model. The updating can also include copying 253 to the one or more shared storage locations 110 one or more of the plurality of output simulation result files when each of the one or more of the plurality of output simulation result files lacks a file attribute match with any of the shared simulation files 111. The one or more of the plurality of output simulation result files lacking a file attribute match with any of the shared simulation files 111 can thereby define one or more copy simulation files, for example. Further, the updating can also include linking 254 a hydrocarbon reservoir simulation model and each of the one or more copy simulation files stored in the one or more shared storage locations 110 and associated with the hydrocarbon reservoir simulation model. A method can then include discarding 255 each of the plurality of output simulation result files stored in the plurality of individual hydrocarbon reservoir simulation model storage locations 112. Discarding 255 these files can make data storage capacity available to other hydrocarbon reservoir simulation runs and, furthermore, can thereby reduce data storage capacity required for hydrocarbon reservoir simulation runs and failure risks for hydrocarbon reservoir simulation runs.

In some circumstances, each of the plurality of individual hydrocarbon reservoir simulation model storage locations 112 can be associated with an individual hydrocarbon reservoir simulation model. Further, each individual hydrocarbon reservoir simulation model can be separate from other hydrocarbon reservoir simulation models, and each hydrocarbon reservoir simulation model can be also associated with a set of hydrocarbon reservoir description data. Two or more hydrocarbon reservoir simulation models can each be associated with one set of hydrocarbon reservoir description data, however. Additionally, each set of hydrocarbon reservoir description data can be associated with a hydrocarbon reservoir, and a hydrocarbon reservoir can be associated with one or more sets of hydrocarbon reservoir description data.

In some circumstances, each of the plurality of individual hydrocarbon reservoir simulation model storage locations 112 can be configured to store ASCII hydrocarbon reservoir data in one or more ASCII simulation files. The one or more shared storage locations 110, in contrast, can be configured to store binary hydrocarbon reservoir data in one or more binary shared simulation files and other ASCII hydrocarbon reservoir data in another one or more ASCII shared simulation files. This storage arrangement can thereby isolate binary hydrocarbon reservoir data in the one or more shared storage locations 110. Further, a method according to an embodiment can further include, for example, altering one or more ASCII shared simulation files associated with a hydrocarbon reservoir simulation model stored in the one or more shared storage locations 110, responsive to user edit-request action, when each of the one or more ASCII shared simulation files is linked to no more than one hydrocarbon reservoir simulation model. A method can also include copying for editing use one or more ASCII shared simulation files associated with a hydrocarbon reservoir simulation model from the one or more shared storage locations 110 to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model. The copied one or more ASCII shared simulation files can thereby define one or more nonexclusive ASCII simulation files, for example. A method can further include linking each of the one or more nonexclusive ASCII simulation files stored in the individual hydrocarbon reservoir simulation model storage location and the associated hydrocarbon reservoir simulation model. A method can still further include altering one or more of the one or more nonexclusive ASCII simulation files stored in the individual hydrocarbon reservoir simulation model storage location. Altering the one or more of the one or more nonexclusive ASCII simulation files stored in the individual hydrocarbon reservoir simulation model storage location can thereby isolate edits to the associated hydrocarbon reservoir simulation model to ASCII simulation files stored in the individual hydrocarbon reservoir simulation model storage location.

A method according to an embodiment can further include, for example, linking each of a plurality of simulation files associated with an existing hydrocarbon reservoir simulation model stored in the one or more shared storage locations 110 and a new hydrocarbon reservoir simulation model. As a result, linking simulation files associated with an existing hydrocarbon reservoir simulation model and a new hydrocarbon reservoir simulation model can thereby duplicate the existing hydrocarbon reservoir simulation model, responsive to user duplication-request action.

A method can also include, for example, creating a new hydrocarbon reservoir simulation model, responsive to receipt of hydrocarbon reservoir description data and user creation-request action.

In some circumstances, a file attribute match can include substantially similar metadata and equal checksums, and metadata can include file size and file type. Further, in some circumstances, the plurality of output simulation result files can be simulation files.

In some circumstances, the one or more shared storage locations 110 and the plurality of separate individual hydrocarbon reservoir simulation model storage locations 112 can have a predetermined collective limit on data storage capacity. Further, a method—including updating the one or more shared storage locations 110 responsive to the plurality of output simulation files associated with a hydrocarbon reservoir simulation run and discarding each of the plurality of output simulation result files stored in the individual hydrocarbon reservoir simulation model storage location associated with the hydrocarbon reservoir simulation model of the hydrocarbon reservoir simulation run—can reduce data storage capacity required for the hydrocarbon reservoir simulation run. Reducing data storage capacity required for the hydrocarbon reservoir simulation run, in turn, can thereby reduce time required to complete a plurality of hydrocarbon reservoir simulation runs.

Notably, embodiments can include a novel algorithm to enhance the hydrocarbon reservoir simulation process where the underlying complexity of efficiently managing storage is masked. The new novel algorithm can optimize storage, for example, by eliminating non-unique hydrocarbon reservoir simulation input or output data files for multiple hydrocarbon reservoir simulation models. Advantageously, users and third-party applications can be unaware of the storage optimization taking place when a hydrocarbon reservoir simulation run is created, duplicated, or submitted. This algorithm can be implemented in the hydrocarbon simulation reservoir environment and can be enforced automatically. Further, the algorithm can ensure seamless integration with post-simulation analysis tools such as, for example, three-dimensional visualization, well plotting, etc.

Figure 5:
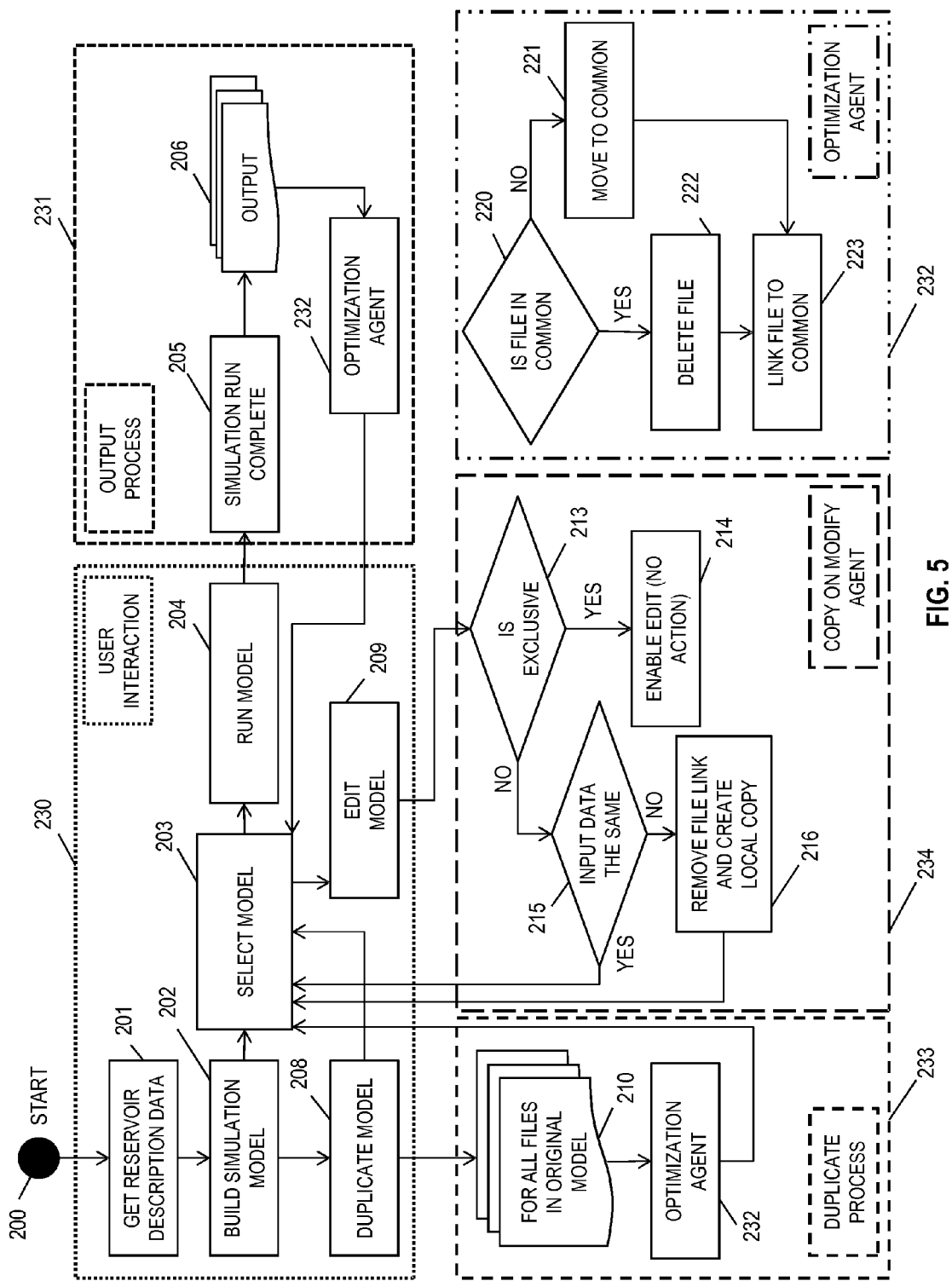
FIG. 5 is a schematic diagram of a method according to an embodiment of the invention.

For example, embodiments of the invention can include at least some portions of a workflow of the algorithm as illustrated, for example, in FIG. 5. A workflow as illustrated can include user interaction 230, an output process 231, an optimization agent 232, a duplicate process 233, and a copy on modify agent 234, for example. User interaction 230 can include actions and decisions of a user of a hydrocarbon reservoir simulator. For instance, user interaction 230 can include, after starting 200, getting hydrocarbon reservoir description data 201. Hydrocarbon reservoir description data can include, for example, observed, measured, or predicted characteristics of a hydrocarbon reservoir, as will be understood by those skilled in the art. For example, hydrocarbon reservoir description data can include data related to a core sample of subsurface material from a wellbore associated with the hydrocarbon reservoir. User interaction 230 can then include building a hydrocarbon reservoir simulation model 202, responsive to the hydrocarbon reservoir description data, as will be understood by those skilled in the art. Building a hydrocarbon reservoir simulation model 202 can include, for example, upscaling models of one or more boreholes associated with the hydrocarbon reservoir. After building a hydrocarbon reservoir simulation model 202, a user can then face a choice. The user can then either duplicate an existing hydrocarbon reservoir simulation model 208 or select an existing hydrocarbon reservoir simulation model 203. If the user chooses to select an existing hydrocarbon reservoir simulation model 203, the user can then choose to either run the selected hydrocarbon reservoir simulation model 204 or to edit the selected hydrocarbon reservoir simulation model 209. If the user chooses to run the hydrocarbon reservoir simulation model 204, an output process 231—that is, a process controlled by a hydrocarbon reservoir simulator, for example—can begin. The user's decision to run the hydrocarbon reservoir simulation model 204 can cause a hydrocarbon reservoir simulation run of the hydrocarbon reservoir simulation model to begin. After the hydrocarbon reservoir simulation run is complete 205, some output 206 is produced, e.g., a plurality of output simulation result files associated with the hydrocarbon reservoir simulation run. An optimization agent 232 can then be performed on the output 206. Consequently, the output process 231 with the optimization agent 232 can include, for example, the following steps:

(1) Select Simulation MODEL
(2) Run Simulation MODEL
(3) Simulation MODEL complete
(4) Run Optimization Agent on MODEL The optimization agent 232 can include first determining whether a given file is stored in the one or more shared storage locations 220. If not, the file can be moved or copied to the one or more shared storage locations 221. If the file is already stored in the one or more shared storage locations 220, however, the file can be deleted 222, and a link to the file stored in the one or more shared storage locations 223 can be created, for example. For example, the optimization agent 232 can include the following steps:

```
(1)  Foreach FILE1 in MODEL
(2)      EXISTS=0
(3)      Foreach FILE2 in SHARED_STORAGE
(4)          If FILE1 and FILE2 share same metadata:
(5)              Both files are already linked, break this loop
(6)          Else
(7)              compare size of FILE1 with FILE2
(8)              If the file size the same
(9)                  compare data of FILE1 with FILE2
(10)                 If they are the same:
(11)                     Delete FILE1 from MODEL
(12)                     Create link pointing to FILE2 with name FILE1
(13)                     EXISTS=1
(14)                 Endif
(15)             Endif
(16)         Endif
(17)     Endfor
(18)     If FILE1 does not exist in SHARED_STORAGE (EXISTS=0)
(19)         if a file with same name (FILE1) already exists in destination
(20)             Copy FILE1+TIMESTAMP to SHARED_STORAGE
(21)         Else
(22)             Copy FILE1 to SHARED_STORAGE
(23)         Delete FILE1 from MODEL
(24)         Create link pointing to FILE2 with name FILE1
(25)     Endif
(26) Endfor
```

Consequently, performing the optimization agent 232 on a plurality of output simulation result files, for example, can include comparing each of the plurality of output simulation result files to the shared simulation files 111. For each output simulation result file that is different than the shared simulation files 111—i.e., that lacks a file attribute match with any shared simulation file—the output simulation result file can be moved 221 to the one or more shared storage locations 110. For each output simulation result file that is the same as one of the shared simulation files 111, i.e., that has a file attribute match with a shared simulation file, the output simulation result file can be deleted 222, and a link can be created 223 between the shared simulation file that had a file attribute match and the hydrocarbon reservoir simulation model. After the optimization agent 232 has been performed on the output 206 of a hydrocarbon reservoir simulation run, the user can then again select a hydrocarbon reservoir simulation model 203. As a result, the optimization agent 232 can optimize user data automatically by maintaining only unique hydrocarbon reservoir simulation input and output data and by utilizing file links for duplicate data.

If the user chooses to duplicate a hydrocarbon reservoir simulation model 208, rather than to run the hydrocarbon reservoir simulation model 204, a duplicate process 233 can begin. The duplicate process 233 can include, for all files in the original hydrocarbon reservoir simulation model 210—i.e., the hydrocarbon reservoir simulation model to be duplicated—performing the optimization agent 232. That is, the optimization agent 232 can determine whether each of the files 210 is stored in the one or more shared storage locations 220. If not, the file can be moved or copied to the one or more shared storage locations 221. If the file is already stored in the one or more shared storage locations 220, however, the file can be deleted 222, and a link to the file stored in the one or more shared storage locations 223 can be created, for example. As a result, the duplicate process 233 with the optimization agent 232 can be described by at least the following steps:

(1) Select Simulation model
(2) User execute duplicate simulation model process
(3) Run Optimization Agent on MODEL If the user chooses to edit a selected hydrocarbon reservoir simulation model 209, a copy on modify agent 234 can begin. The copy on modify agent 234 can include first determining whether a given hydrocarbon reservoir simulation model is exclusive 213. That is, it can determine whether the hydrocarbon reservoir simulation model is linked to one or more shared simulation files 111 that are also linked to another hydrocarbon reservoir simulation model. If not, i.e., if the selected hydrocarbon reservoir simulation model is exclusive 213, the copy on modify agent can enable the user to edit the selected hydrocarbon reservoir simulation model 214. If the selected hydrocarbon reservoir simulation model is not exclusive 213—that is, if one or more shared simulation files 111 linked to the selected hydrocarbon reservoir simulation model are also linked to another hydrocarbon reservoir simulation model—the copy on modify agent 234 can then determine whether the input data are the same for the selected hydrocarbon reservoir simulation model and the other hydrocarbon reservoir simulation model 215. If not, the copy on modify agent 234 can then remove the link between the one or more non-exclusive shared simulation files and the selected hydrocarbon reservoir simulation model and create a local copy of the one or more non-exclusive shared simulation files 216. That is, the copy on modify agent 234 can copy the one or more non-exclusive shared simulation files to the individual hydrocarbon reservoir simulation model storage location associated with the selected hydrocarbon reservoir simulation model. The copy on modify agent 234 can then allow the user to again select a hydrocarbon reservoir simulation model 203. If the input data are the same 215, however, the copy on modify agent 234 can simply allow the user to again select a hydrocarbon reservoir simulation model 203. As a result, a copy on modification algorithm for ASCII files can include, for example, the following steps:

```
(1) User opens a FILE1 in MODEL
(2) If FILE1 read only mode
(3)     view FILE1
(4) Else
(5)     If FILE1 is exclusive to FILE1
(6)         use FILE1 in the SHARED_STORAGE
(7)     Else
(8)         Delete FILE1 link in MODEL
(9)         Copy FILE1 to MODEL
(10)        Edit FILE1
(11)    Endif
(12) Endif
```

Stated differently, an embodiment can include four related processes: (1) a duplication process 233, (2) a copying-the-data-on-modification agent 234, (3) an output process 231, and (4) an optimization agent 232.

A storage optimization agent 232, for example, can be responsible for optimizing storage by eliminating duplicate files. Each new target file can be compared to all existing files in the shared storage, for example. If the file exists in the shared storage, then the file can be deleted, and a file link can be created maintaining the original file structure. If the file does not exist in the shared storage, then the file can be moved to the shared storage, and a file link can be created maintaining the original file structure. An important component of the optimization agent 232 can be its reliance on identifying similar files efficiently. It can be critical for the implemented comparison algorithm to minimize overhead of the optimization agent 232 on the overall performance of high-performance storage (HPS). Therefore, a two-tiered file similarity detection algorithm can efficiently identify unique files. In the first stage, a file's file metadata, hashed in a database, can be used to filter similar files. For example, file metadata can include file size, type, etc. Further, a comparison of checksum for each file can be performed to verify similarity before file linking. At least one advantage of first using metadata to identify similar files is that a comparison of metadata can be faster than a checksum comparison. Further, a database to maintain metadata and checksum information can be unnecessary. Similarly, server administration can be unnecessary, which can thus reduce overhead costs.

In duplication process 233, a new instance of a selected hydrocarbon reservoir simulation model can be created. This can be a first instance where the optimization agent 232 is called. All files can be included in the shared storage if not already existing. The hydrocarbon reservoir simulation model can then be edited if desired by a user, who can initiate the copy on modify agent 234.

The copy on modify agent 234 can check if the target file is shared or exclusive. If it is exclusive, no action is required, for example, and the user can be permitted to edit the files. However, if the file is shared by several hydrocarbon reservoir simulation models—i.e., if it is not exclusive—then a separate copy can be created for editing to insure the consistency of the hydrocarbon reservoir simulation models.

Once any editing has been completed, a user can submit the simulation to a high-performance computing (HPC) environment, which can trigger the simulation output process 231. The simulation output process 231 can start with executing the simulation of the hydrocarbon reservoir simulation model. After a job has been completed and files have been created, the output process 231 can initiate the optimization agent 232.

The four processes can advantageously enhance data storage and retrieval during performance of hydrocarbon reservoir simulation runs in several ways. For example, a model duplication process 233 can optimize reservoir simulation input data for multiple simulation runs by using single unique files and utilizing links for multiple simulation runs for both binary and ASCII files. Further, a duplication process can include (a) simulation engineers selecting a simulation model 203. A duplication process can then include (b) simulation engineers duplicating the selected model for a new study 208. Then, (c) this duplicate process can execute an optimization agent 232, where only unique copies can be placed in a shared storage location. File links can be created pointing to the unique copy.

A copying-the-data-on-modification agent 234, on the other hand, can be a process to ensure that needed unique user data is local to a selected model. For example, a copying-the-data-on-modification agent 234 can include (a) simulation engineers selecting input ASCII files for modification. A copying-the-data-on-modification agent can then include (b) changing the original file 214 if the selected file is exclusive 213. Further, (c) if the selected file is not exclusive 213, the link to the original file can be removed, and the modified file can be copied to the model input location 216.

Turning to an output process 231, an output process 231 can optimize data for multiple simulation runs by using single unique files and utilizing links for multiple simulation runs. For example, (a) the reservoir simulator can produce output 206. Large binary files can usually be identical if the run belongs to the same model. Further, (b) this process can execute an optimization agent 232 where only unique copies are placed in a shared storage location. File links can be created pointing to the unique copy.

The optimization agent 232 itself can (a) search the given reservoir simulation file in the shared storage. This search can be a one file to all files in the shared storage comparison. In addition, an optimization agent can compare the sizes of the files, i.e., metadata hashed from the database, to determine whether they are the same before conducting a checksum comparison between both files to find a match. Then, (b) if the file exists in the shared storage 220, the agent can delete the new generated reservoir simulation file 222 and link the shared file to the new model location 223. Further, (c) if the file does not exist in the shared storage 220, the agent can copy the new generated reservoir simulation file to the shared storage 231 and can delete the file in the model location.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

That claimed is:

1. A system to enhance data storage and retrieval during performance of a plurality of hydrocarbon reservoir simulation runs of one or more hydrocarbon reservoir simulation models, the system comprising:
    one or more processors;
    one or more displays in communication with the one or more processors;
    one or more databases in communication with the one or more processors and including a plurality of separate individual hydrocarbon reservoir simulation model storage locations and one or more other storage locations separate from the plurality of individual hydrocarbon reservoir simulation model storage locations, each of the plurality of individual hydrocarbon reservoir simulation model storage locations being associated with one or more hydrocarbon reservoir simulation models, the one or more other storage locations having a plurality of simulation files stored therein and being configured to share the plurality of simulation files among the one or more hydrocarbon reservoir simulation models to thereby define one or more shared storage locations, the plurality of simulation files being shared among the one or more hydrocarbon reservoir simulation models being stored in the one or more shared locations also defining shared simulation files; and
    non-transitory memory medium in communication with the one or more processors, the memory medium including:
    a hydrocarbon reservoir simulation run module including computer-readable instructions stored therein that when executed cause the system to perform the steps of:
        initiating a plurality of hydrocarbon reservoir simulation runs of one or more hydrocarbon reservoir simulation models responsive to user run-request action,
        retrieving, for two or more of the plurality of hydrocarbon reservoir simulation runs, a selected one of the one or more shared simulation files from the one or more shared storage locations for use as an input simulation file during the two or more of the plurality of hydrocarbon reservoir simulation runs, the selected one of the one or more simulation files being the same of the one or more shared simulation files,
        completing each of the plurality of hydrocarbon reservoir simulation runs responsive to the retrieved same one of the one or more shared simulation files,
        producing a plurality of output simulation result files associated with and responsive to each of the plurality of hydrocarbon reservoir simulation runs, each of the plurality of output simulation result files being associated with a hydrocarbon reservoir simulation model, and
        storing each output simulation result file in one or more of the plurality of individual hydrocarbon reservoir simulation model storage locations associated with the hydrocarbon reservoir simulation model associated with the output simulation result file, and
    a linking module including computer-readable instructions stored therein that when executed cause the system to perform the steps of:
        comparing each of a plurality of output simulation result files to each of the shared simulation files stored in the one or more shared storage locations,
        determining if one or more of the plurality of output simulation result files each has a file attribute match with one or more of the shared simulation files,
        updating the one or more shared storage locations if one or more of the plurality of output simulation result files each has a file attribute match with one or more of the shared simulation files, the updating including:
            linking a hydrocarbon reservoir simulation model and one or more shared simulation files when each of the one or more shared simulation files has a file attribute match with one or more of the plurality of output simulation result files associated with the hydrocarbon reservoir simulation model,
            copying one or more of the plurality of output simulation result files to the one or more shared storage locations when each of the one or more of the plurality of output simulation result files lacks a file attribute match with any of the shared simulation files, the one or more of the plurality of output simulation result files lacking a file attribute match with any of the shared simulation files to thereby define one or more copy simulation files, and linking a hydrocarbon reservoir simulation model and each of the one or more copy simulation files associated with the hydrocarbon reservoir simulation model stored in the one or more shared storage locations, and discarding each of the plurality of output simulation result files stored in the plurality of individual hydrocarbon reservoir simulation model storage locations to make data storage capacity available to other hydrocarbon reservoir simulation runs and to thereby reduce data storage capacity required for hydrocarbon reservoir simulation runs and failure risks for hydrocarbon reservoir simulation runs.

2. A system of claim 1, wherein each of the plurality of individual hydrocarbon reservoir simulation model storage locations is associated with an individual hydrocarbon reservoir simulation model, each individual hydrocarbon reservoir simulation model separate from other hydrocarbon reservoir simulation models, each hydrocarbon reservoir simulation model associated with a set of hydrocarbon reservoir description data, two or more hydrocarbon reservoir simulation models each associated with one set of hydrocarbon reservoir description data, each set of hydrocarbon reservoir description data associated with a hydrocarbon reservoir, a hydrocarbon reservoir associated with one or more sets of hydrocarbon reservoir description data.

3. A system of claim 1, wherein each of the plurality of individual hydrocarbon reservoir simulation model storage locations is configured to store ASCII hydrocarbon reservoir data in one or more ASCII simulation files and the one or more shared storage locations are configured to store binary hydrocarbon reservoir data in one or more binary shared simulation files and other ASCII hydrocarbon reservoir data in another one or more ASCII shared simulation files to thereby isolate binary hydrocarbon reservoir data in the one or more shared storage locations.

4. A system of claim 3, wherein the system further comprises one or more input and output units in communication with the one or more processors and positioned to receive as input one or more user actions, and wherein the memory medium further includes a hydrocarbon reservoir simulation model-editing module including computer-readable instructions stored therein that when executed cause the system to perform the steps of:

altering one or more ASCII shared simulation files associated with a hydrocarbon reservoir simulation model stored in the one or more shared storage locations, responsive to user edit-request action through the one or more input and output units, when each of the one or more ASCII shared simulation files is linked to no more than one hydrocarbon reservoir simulation model;

copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action through the one or more input and output units, when each of the one or more ASCII shared simulation files is linked to more than one hydrocarbon reservoir simulation model, the copied one or more ASCII shared simulation files to thereby define one or more nonexclusive ASCII simulation files;

linking each of the one or more nonexclusive ASCII simulation files stored in the individual hydrocarbon reservoir simulation model storage location and the associated hydrocarbon reservoir simulation model; and altering one or more of the one or more nonexclusive ASCII simulation files stored in the individual hydrocarbon reservoir simulation model storage location to thereby isolate edits to the associated hydrocarbon reservoir simulation model to ASCII simulation files stored in the individual hydrocarbon reservoir simulation model storage location.

5. A system of claim 1, wherein the system further comprises one or more input and output units in communication with the one or more processors and positioned to receive as input one or more user actions, and wherein the memory medium further includes a hydrocarbon reservoir simulation model-duplicating module including computer-readable instructions stored therein that when executed cause the system to perform the step of:

linking each of a plurality of simulation files associated with an existing hydrocarbon reservoir simulation model stored in the one or more shared storage locations and a new hydrocarbon reservoir simulation model to thereby duplicate the existing hydrocarbon reservoir simulation model, responsive to user duplication-request action through the one or more input and output units.

6. A system of claim 1, wherein the system further comprises one or more input and output units in communication with the one or more processors and positioned to receive as input one or more sets of hydrocarbon reservoir description data and one or more user actions, and wherein the memory medium further includes a hydrocarbon reservoir simulation model-building module including computer-readable instructions stored therein that when executed cause the system to perform the step of:

creating a new hydrocarbon reservoir simulation model responsive to receipt of hydrocarbon reservoir description data and user creation-request action through the one or more input and output units.

7. A system of claim 1, wherein a file attribute match includes substantially similar metadata and equal checksums, metadata including file size and file type.

8. A system of claim 1, wherein the system has a predetermined limit on data storage capacity and wherein operation of the linking module for a hydrocarbon reservoir simulation run reduces data storage capacity required for the hydrocarbon reservoir simulation run to thereby reduce time required to complete a plurality of hydrocarbon reservoir simulation runs.

9. Non-transitory computer-readable medium having one or more computer programs stored therein operable by one or more processors to enhance data storage and retrieval during performance of a plurality of hydrocarbon reservoir simulation runs of one or more hydrocarbon reservoir simulation models, the one or more computer programs comprising a set of instructions that, when executed by the one or more processors, cause the one or more processors to perform the operations of:

initiating a plurality of hydrocarbon reservoir simulation runs of one or more hydrocarbon reservoir simulation models responsive to user run-request action;

retrieving, for two or more of the plurality of hydrocarbon reservoir simulation runs, a selected one of one or more shared simulation files from one or more shared storage locations for use as an input simulation file during the two or more of the plurality of hydrocarbon reservoir simulation runs, the one or more storage locations configured to share a plurality of simulation files among the one or more hydrocarbon reservoir simulation models to thereby define one or more shared storage locations, the plurality of simulation files being shared among the one or more hydrocarbon reservoir simulation models being stored in the one or more shared locations also defining shared simulation files, the selected one of the one or more simulation files being the same of the one or more shared simulation files;

completing each of the plurality of hydrocarbon reservoir simulation runs responsive to the retrieved same one of the one or more shared simulation files;

producing a plurality of output simulation result files associated with and responsive to each of the plurality of hydrocarbon reservoir simulation runs, each of the plurality of output simulation result files being associated with a hydrocarbon reservoir simulation model;

storing each output simulation result file in one or more of a plurality of individual hydrocarbon reservoir simulation model storage locations, each of the plurality of individual hydrocarbon reservoir simulation model storage locations associated with one or more hydrocarbon reservoir simulation models, the one or more of the plurality of individual hydrocarbon reservoir simulation model storage locations associated with the hydrocarbon reservoir simulation model associated with the output simulation result file;

comparing each of the plurality of output simulation result files to each of the shared simulation files stored in the one or more shared storage locations;

determining if one or more of the plurality of output simulation result files each has a file attribute match with one or more of the shared simulation files;

updating the one or more shared storage locations if one or more of the plurality of output simulation result files each has a file attribute match with one or more of the shared simulation files, the updating including:
   linking a hydrocarbon reservoir simulation model and one or more shared simulation files when each of the one or more shared simulation files has a file attribute match with one or more of the plurality of output simulation result files associated with the hydrocarbon reservoir simulation model,
   copying one or more of the plurality of output simulation result files to the one or more shared storage locations when each of the one or more of the plurality of output simulation result files lacks a file attribute match with any of the shared simulation files, the one or more of the plurality of output simulation result files lacking a file attribute match with any of the shared simulation files to thereby define one or more copy simulation files, and
   linking a hydrocarbon reservoir simulation model and each of the one or more copy simulation files associated with the hydrocarbon reservoir simulation model stored in the one or more shared storage locations; and discarding each of the plurality of output simulation result files stored in the plurality of individual hydrocarbon reservoir simulation model storage locations to make data storage capacity available to other hydrocarbon reservoir simulation runs and to thereby reduce data storage capacity required for hydrocarbon reservoir simulation runs and failure risks for hydrocarbon reservoir simulation runs.

10. Non-transitory computer-readable medium having one or more computer programs stored therein of claim 9, wherein each of the plurality of individual hydrocarbon reservoir simulation model storage locations is associated with an individual hydrocarbon reservoir simulation model, each individual hydrocarbon reservoir simulation model separate from other hydrocarbon reservoir simulation models, each hydrocarbon reservoir simulation model associated with a set of hydrocarbon reservoir description data, two or more hydrocarbon reservoir simulation models each associated with one set of hydrocarbon reservoir description data, each set of hydrocarbon reservoir description data associated with a hydrocarbon reservoir, a hydrocarbon reservoir associated with one or more sets of hydrocarbon reservoir description data.

11. Non-transitory computer-readable medium having one or more computer programs stored therein of claim 9, wherein each of the plurality of individual hydrocarbon reservoir simulation model storage locations is configured to store ASCII hydrocarbon reservoir data in one or more ASCII simulation files and the one or more shared storage locations are configured to store binary hydrocarbon reservoir data in one or more binary shared simulation files and other ASCII hydrocarbon reservoir data in another one or more ASCII shared simulation files to thereby isolate binary hydrocarbon reservoir data in the one or more shared storage locations.

12. Non-transitory computer-readable medium having one or more computer programs stored therein of claim 11, wherein the set of instructions, when executed by the one or more processors, further cause the one or more processors to perform the operations of:
   altering one or more ASCII shared simulation files associated with a hydrocarbon reservoir simulation model stored in the one or more shared storage locations, responsive to user edit-request action, when each of the one or more ASCII shared simulation files is linked to no more than one hydrocarbon reservoir simulation model;
   copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model, the copied one or more ASCII shared simulation files to thereby define one or more nonexclusive ASCII simulation files;
   linking each of the one or more nonexclusive ASCII simulation files stored in the individual hydrocarbon reservoir simulation model storage location and the associated hydrocarbon reservoir simulation model; and
   altering one or more of the one or more nonexclusive ASCII simulation files stored in the individual hydrocarbon reservoir simulation model storage location to thereby isolate edits to the associated hydrocarbon reservoir simulation model to ASCII simulation files stored in the individual hydrocarbon reservoir simulation model storage location.

13. Non-transitory computer-readable medium having one or more computer programs stored therein of claim 9, wherein the set of instructions, when executed by the one or more processors, further cause the one or more processors to perform the operation of:

linking each of a plurality of simulation files associated with an existing hydrocarbon reservoir simulation model stored in the one or more shared storage locations and a new hydrocarbon reservoir simulation model to thereby duplicate the existing hydrocarbon reservoir simulation model, responsive to user duplication-request action.

14. Non-transitory computer-readable medium having one or more computer programs stored therein of claim 9, wherein the set of instructions, when executed by the one or more processors, further cause the one or more processors to perform the operation of:

creating a new hydrocarbon reservoir simulation model responsive to receipt of hydrocarbon reservoir description data and user creation-request action.

15. Non-transitory computer-readable medium having one or more computer programs stored therein of claim 9, wherein a file attribute match includes substantially similar metadata and equal checksums, metadata including file size and file type.

16. Non-transitory computer-readable medium having one or more computer programs stored therein of claim 9, wherein the one or more shared storage locations and the plurality of separate individual hydrocarbon reservoir simulation model storage locations have a predetermined collective limit on data storage capacity, and wherein updating the one or more shared storage locations responsive to the plurality of output simulation files associated with a hydrocarbon reservoir simulation run and discarding each of the plurality of output simulation result files stored in the individual hydrocarbon reservoir simulation model storage location associated with the hydrocarbon reservoir simulation model of the hydrocarbon reservoir simulation run reduce data storage capacity required for the hydrocarbon reservoir simulation run to thereby reduce time required to complete a plurality of hydrocarbon reservoir simulation runs.

17. A computer-implemented method to enhance data storage and retrieval during performance of a plurality of hydrocarbon reservoir simulation runs of one or more hydrocarbon reservoir simulation models, the method comprising:

initiating a plurality of hydrocarbon reservoir simulation runs of one or more hydrocarbon reservoir simulation models responsive to user run-request action;

retrieving, for two or more of the plurality of hydrocarbon reservoir simulation runs, a selected one of one or more shared simulation files from one or more shared storage locations for use as an input simulation file during the two or more of the plurality of hydrocarbon reservoir simulation runs, the one or more storage locations configured to share a plurality of simulation files among the one or more hydrocarbon reservoir simulation models to thereby define one or more shared storage locations, the plurality of simulation files being shared among the one or more hydrocarbon reservoir simulation models being stored in the one or more shared locations also defining shared simulation files, the selected one of the one or more simulation files being the same of the one or more shared simulation files;

completing each of the plurality of hydrocarbon reservoir simulation runs responsive to the retrieved same one of the one or more shared simulation files;

producing a plurality of output simulation result files associated with and responsive to each of the plurality of hydrocarbon reservoir simulation runs, each of the plurality of output simulation result files being associated with a hydrocarbon reservoir simulation model;

storing each output simulation result file in one or more of a plurality of individual hydrocarbon reservoir simulation model storage locations, each of the plurality of individual hydrocarbon reservoir simulation model storage locations associated with one or more hydrocarbon reservoir simulation models, the one or more of the plurality of individual hydrocarbon reservoir simulation model storage locations associated with the hydrocarbon reservoir simulation model associated with the output simulation result file;

comparing each of the plurality of output simulation result files to each of the shared simulation files stored in the one or more shared storage locations;

determining if one or more of the plurality of output simulation result files each has a file attribute match with one or more of the shared simulation files;

updating the one or more shared storage locations if one or more of the plurality of output simulation result files each has a file attribute match with one or more of the shared simulation files, the updating including:

linking a hydrocarbon reservoir simulation model and one or more shared simulation files when each of the one or more shared simulation files has a file attribute match with one or more of the plurality of output simulation result files associated with the hydrocarbon reservoir simulation model, copying one or more of the plurality of output simulation result files to the one or more shared storage locations when each of the one or more of the plurality of output simulation result files lacks a file attribute match with any of the shared simulation files, the one or more of the plurality of output simulation result files lacking a file attribute match with any of the shared simulation files to thereby define one or more copy simulation files, and linking a hydrocarbon reservoir simulation model and each of the one or more copy simulation files associated with the hydrocarbon reservoir simulation model stored in the one or more shared storage locations; and discarding each of the plurality of output simulation result files stored in the plurality of individual hydrocarbon reservoir simulation model storage locations to make data storage capacity available to other hydrocarbon reservoir simulation runs and to thereby reduce data storage capacity required for hydrocarbon reservoir simulation runs and failure risks for hydrocarbon reservoir simulation runs.

18. A computer-implemented method of claim 17, wherein each of the plurality of individual hydrocarbon reservoir simulation model storage locations is associated with an individual hydrocarbon reservoir simulation model, each individual hydrocarbon reservoir simulation model separate from other hydrocarbon reservoir simulation models, each hydrocarbon reservoir simulation model associated with a set of hydrocarbon reservoir description data, two or more hydrocarbon reservoir simulation models each associated with one set of hydrocarbon reservoir description data, each set of hydrocarbon reservoir description data associated with a hydrocarbon reservoir, a hydrocarbon reservoir associated with one or more sets of hydrocarbon reservoir description data.

19. A computer-implemented method of claim 17, wherein each of the plurality of individual hydrocarbon reservoir simulation model storage locations is configured to store ASCII hydrocarbon reservoir data in one or more ASCII simulation files and the one or more shared storage locations are configured to store binary hydrocarbon reservoir data in one or more binary shared simulation files and other ASCII hydrocarbon reservoir data in another one or more ASCII shared simulation files to thereby isolate binary hydrocarbon reservoir data in the one or more shared storage locations.

20. A computer-implemented method of claim 19, wherein the method further comprises:
    altering one or more ASCII shared simulation files associated with a hydrocarbon reservoir simulation model stored in the one or more shared storage locations, responsive to user edit-request action, when each of the one or more ASCII shared simulation files is linked to no more than one hydrocarbon reservoir simulation model;
    copying for editing use one or more ASCII shared simulation files associated with a hydrocarbon reservoir simulation model from the one or more shared storage locations to the individual hydrocarbon reservoir simulation model storage location associated with the hydrocarbon reservoir simulation model, responsive to user edit-request action, when each of the one or more ASCII shared simulation files is linked to more than one hydrocarbon reservoir simulation model, the copied one or more ASCII shared simulation files to thereby define one or more nonexclusive ASCII simulation files;
    linking each of the one or more nonexclusive ASCII simulation files stored in the individual hydrocarbon reservoir simulation model storage location and the associated hydrocarbon reservoir simulation model; and
    altering one or more of the one or more nonexclusive ASCII simulation files stored in the individual hydrocarbon reservoir simulation model storage location to thereby isolate edits to the associated hydrocarbon reservoir simulation model to ASCII simulation files stored in the individual hydrocarbon reservoir simulation model storage location.

21. A computer-implemented method of claim 17, wherein the method further comprises:
    linking each of a plurality of simulation files associated with an existing hydrocarbon reservoir simulation model stored in the one or more shared storage locations and a new hydrocarbon reservoir simulation model to thereby duplicate the existing hydrocarbon reservoir simulation model, responsive to user duplication-request action.

22. A computer-implemented method of claim 17, wherein the method further comprises:
    creating a new hydrocarbon reservoir simulation model responsive to receipt of hydrocarbon reservoir description data and user creation-request action.

23. A computer-implemented method of claim 17, wherein a file attribute match includes substantially similar metadata and equal checksums, metadata including file size and file type.

24. A computer-implemented method of claim 17, wherein the one or more shared storage locations and the plurality of separate individual hydrocarbon reservoir simulation model storage locations have a predetermined collective limit on data storage capacity, and wherein updating the one or more shared storage locations responsive to the plurality of output simulation files associated with a hydrocarbon reservoir simulation run and discarding each of the plurality of output simulation result files stored in the individual hydrocarbon reservoir simulation model storage location associated with the hydrocarbon reservoir simulation model of the hydrocarbon reservoir simulation run reduce data storage capacity required for the hydrocarbon reservoir simulation run to thereby reduce time required to complete a plurality of hydrocarbon reservoir simulation runs.

* * * * *